(12) United States Patent
Tanaka et al.

(10) Patent No.: US 8,670,231 B2
(45) Date of Patent: Mar. 11, 2014

(54) SEMICONDUCTOR RECORDING MEDIUM RECORDING AND/OR REPRODUCING APPARATUS

(75) Inventors: Seiki Tanaka, Tokyo (JP); Haruyuki Kouno, Kanagawa (JP)

(73) Assignee: Sony Corporation, Tokyo (JP)

(*) Notice: Subject to any disclaimer, the term of this patent is extended or adjusted under 35 U.S.C. 154(b) by 170 days.

(21) Appl. No.: 13/414,965

(22) Filed: Mar. 8, 2012

(65) Prior Publication Data

US 2012/0243168 A1 Sep. 27, 2012

(30) Foreign Application Priority Data

Mar. 23, 2011 (JP) ................................. 2011-064369

(51) Int. Cl.
*G06F 1/20* (2006.01)
*H05K 7/20* (2006.01)

(52) U.S. Cl.
USPC ............ 361/679.46; 361/679.47; 361/679.54; 361/688; 361/697

(58) Field of Classification Search
USPC ........ 361/679.46–679.54, 688–723; 174/520, 174/535, 559–563, 547, 548, 252
See application file for complete search history.

(56) References Cited

U.S. PATENT DOCUMENTS

| 5,233,575 | A  | * | 8/1993  | Uchino et al. | 369/13.38 |
| 6,483,784 | B1 | * | 11/2002 | Nakatani et al. | 369/13.38 |
| 6,532,125 | B1 | * | 3/2003  | Hamann et al. | 360/59 |
| 6,636,477 | B1 | * | 10/2003 | Miyamoto et al. | 369/286 |
| 7,188,922 | B2 | * | 3/2007  | Kubo | 347/18 |
| 7,852,628 | B2 | * | 12/2010 | Hirohata et al. | 361/695 |
| 2009/0059525 | A1 | * | 3/2009 | Peng et al. | 361/697 |

FOREIGN PATENT DOCUMENTS

JP 3-188589 8/1991

* cited by examiner

*Primary Examiner* — Hoa C Hguyen
*Assistant Examiner* — Ahmad D Barnes
(74) *Attorney, Agent, or Firm* — Frommer Lawrence & Haug LLP; William S. Frommer

(57) ABSTRACT

A semiconductor recording medium recording and/or reproducing apparatus includes: a medium holder that has a medium housing unit in which a semiconductor recording medium is detachably housed; an exterior case that has a medium entrance through which the semiconductor recording medium is inserted and ejected, and in which the medium holder is housed in a state where the medium housing unit is opposed to the medium entrance; an openable and closeable cover that opens and closes the medium entrance; a heat sink that is contactable with the semiconductor recording medium housed in the medium housing unit; and a heat sink moving unit that moves the heat sink in cooperation with an opening and closing operation of the openable and closeable cover.

7 Claims, 27 Drawing Sheets

US 8,670,231 B2

SEMICONDUCTOR RECORDING MEDIUM RECORDING AND/OR REPRODUCING APPARATUS

BACKGROUND

The present disclosure relates to a semiconductor recording medium recording and/or reproducing apparatus that performs recording or reproducing of information signals using a semiconductor recording medium, and particularly to the heat radiation structure of a semiconductor recording medium, and a drip-proof structure against raindrops or the like.

In the related art, as such a kind of semiconductor recording medium recording and/or reproducing apparatus, for example, there is an apparatus disclosed in Japanese Unexamined Patent Application Publication No. 3-188589. In Japanese Unexamined Patent Application Publication No. 3-188589, an IC card removing heat radiation of the IC card and a card inserting device are disclosed. The IC card and the card inserting device disclosed in Japanese Unexamined Patent Application Publication No. 3-188589 are configured by an IC card having an electronic circuit and a connection unit of the electronic circuit, and a card inserting device having a connection unit connected to the connection unit of the IC card with the IC card inserted. The card inserting device includes a heat radiation unit, a press unit, a press releasing unit, a connection detecting unit, and a discharge detecting unit. The press unit presses a heat receiving unit of the heat radiation unit to the IC card, and the press releasing unit releases the press of the press unit. The connection detecting unit detects that the connection unit of the IC card is connected to the connection unit of the card inserting device to operate the press unit, and the discharge detecting unit detects that the IC card is discharged from the card inserting device to operate the press releasing unit.

According to the IC card and the card inserting device disclosed in Japanese Unexamined Patent Application Publication No. 3-188589, an effect that it is possible to realize the IC card provided with an electronic circuit with a large amount of heat radiation by effectively performing the heat radiation such that the heat radiation unit is tightly pressed by the IC card, is expected.

However, in the IC card and the card inserting device described above, the card inserting device is provided with a card guide having a card housing unit to and from which the IC card is attached and detached, and a heat radiation fin is disposed in the card housing unit. The heat radiation fin is urged in a direction of narrowing the card housing unit by a spring, the heat radiation fin is urged by the spring to be tightly pressed to the IC card, and the heat is radiated from the IC card by the heat radiation fin, thereby suppressing the heat radiation of the IC card. The operation of inserting and ejecting the IC card with respect to the card housing unit is performed against the press force of the heat radiation fin by the spring. For this reason, when the IC card is inserted or ejected, the IC card typically encounters friction, and thus there is a problem that the IC card is worn.

SUMMARY

There is a problem that the heat radiation fin is urged by the spring in the IC card and the card inserting device in the related art, the IC card typically encounters friction the heat radiation fin to insert or draw the IC card, and thus the IC card is worn.

According to an embodiment of the present disclosure, a semiconductor recording medium recording and/or reproducing apparatus includes a medium holder, an exterior case, an openable and closable cover, a heat sink, and a heat sink moving unit. The medium holder has a medium housing unit in which a semiconductor recording medium is attachably and detachably housed. The exterior case has a medium entrance through which the semiconductor recording medium is inserted and ejected, the medium holder is housed in a state where the medium housing unit is opposed to the medium entrance, and the medium entrance is openable and closeable by the openable and closeable cover. The heat sink is contactable with the semiconductor recording medium housed in the medium housing unit, and the heat sink moving unit moves the heat sink in cooperation with an opening and closing operation of the openable and closeable cover. The heat sink is moved in a direction separating from the medium housing unit at the time of opening the openable and closeable cover and the heat sink is moved in a direction approaching the medium housing unit at the time of closing the openable and closeable cover by an operation of the heat sink moving unit, to come in press contact with the semiconductor recording medium housed in the medium housing unit.

According to the semiconductor recording medium recording and/or reproducing apparatus of the embodiment of the present disclosure, the heat sink moving unit moves the heat sink in cooperation with the opening and closing operation of the medium entrance by the openable and closeable cover. Accordingly, the heat sink is moved in the direction separating from the medium housing unit at the time of opening the openable and closeable cover, and the heat sink is moved in the direction approaching the medium housing unit at the time of closing the openable and closeable cover to come in press contact with the semiconductor recording medium housed in the medium housing unit. As a result, when the semiconductor recording medium is inserted and ejected, the semiconductor recording medium does not encounter friction from the heat sink, and thus it possible to prevent the semiconductor recording medium from being damaged by the rubbing contact with the heat sink.

DETAILED DESCRIPTION OF EMBODIMENTS

A press contact and separation operation with respect to a semiconductor recording medium by a heat sink provided adjacent to a medium housing unit, and an opening and closing operation of an openable and closeable cover opening and closing a medium entrance opposed to the medium housing unit are interlocked. When the semiconductor recording medium is inserted and ejected, the heat sink is separated from the medium housing unit such that the semiconductor recording medium does not encounter friction from the heat sink, and thus an apparatus without concern of damage caused by the sliding contact of the semiconductor recording medium is realized by a simple configuration.

[Embodiments]

FIG. 1 to FIG. 5 show an example of a semiconductor recording medium recording and/or reproducing apparatus according to an embodiment of the present disclosure, and the semiconductor recording medium recording and reproducing apparatus is a memory card recording and reproducing apparatus 1 capable of recording and reproducing information signals using a semiconductor recording medium. However, the semiconductor recording medium recording and/or reproducing apparatus may be a semiconductor recording medium recording apparatus that performs only the recording of the information signals and may be a semiconductor recording medium reproducing apparatus that performs only the reproducing of the information signals.

Figure 29:
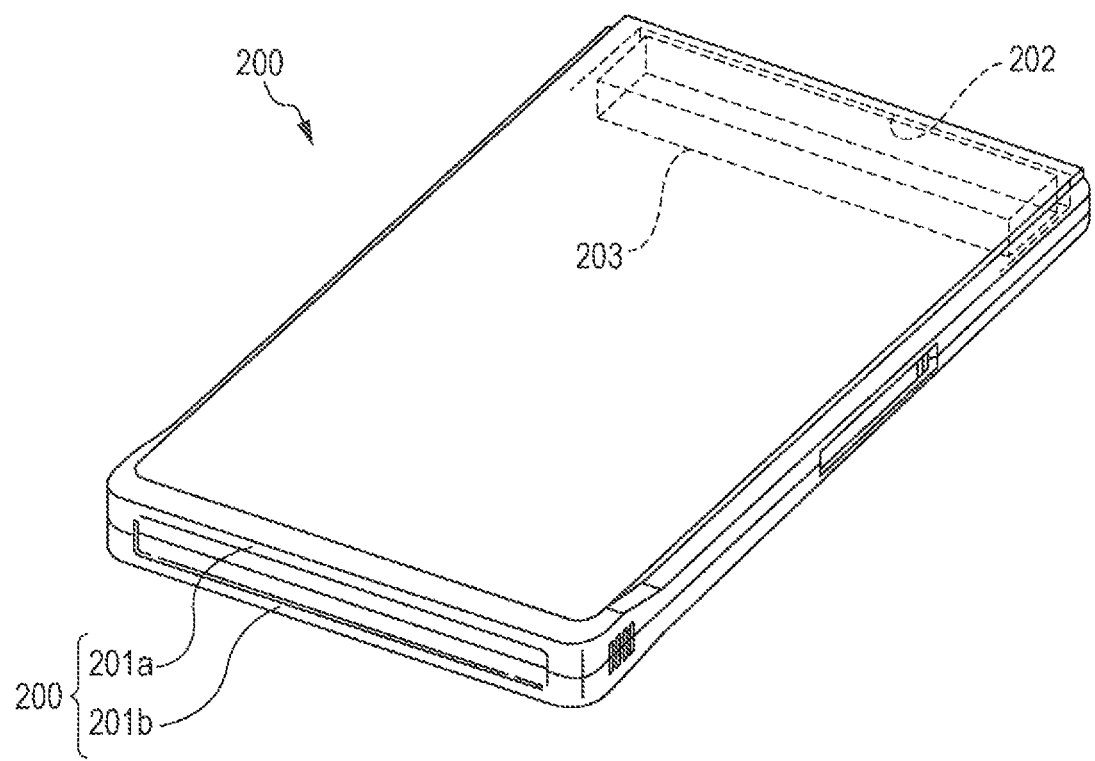
FIG. 29 is an exterior perspective view illustrating an example of a preferred embodiment of a semiconductor recording medium used in the semiconductor recording medium recording and/or reproducing apparatus shown in FIG. 1.

First, the preferred semiconductor recording medium used in the memory card recording and reproducing apparatus 1 will be described with reference to FIG. 29. A memory card 200 shown in FIG. 29 represents an example of an embodiment of the semiconductor recording medium, and is provided with a rectangular case 201 having a proper thickness, a semiconductor memory (not shown) housed in the case 201, a control device thereof, and the like. The control device is provided with a central processing unit or the like that writes information signals into the semiconductor memory and reads the information signal recorded in the semiconductor memory.

The case 201 of the memory card 200 includes a first case 201a and a second case 201b combined by overlapping, and the semiconductor memory, the control device, and the like are housed in a space surrounded by both cases 201a and 201b. One end portion of the case 201 in longitudinal direction is provided with a connection opening portion 202, and a connection unit 203 is provided in the connection opening portion 202. The connection unit 203 attachably and detachably engages with a connection unit to be electrically connected to another apparatus (for example, the memory card recording and reproducing device 1 or the like) and is configured by a connector. Although not shown, the connection unit 203 is connected to the control device and the like in the case 201, and transmits an information signal, a control signal, and the like between the control device or the semiconductor memory and the external device.

The first case 201a and the second case 201b of the case 201 are formed of a material having high reliability (heat resistance, impact resistance, insertion and ejection durability). Particularly, since heat is generated in the semiconductor memory and the control device by operations thereof, the semiconductor memory and the control device are formed of a material capable of relatively easily transmitting the heat to early radiate the generated heat. As the material of the case 201, a plastic such as ABS (acrylonitrile butadiene styrene resin) is very suitable. However, the material of the case 201 is not limited to the ABS, and obviously POM (polyacetal) and the other plastic may be used. In addition, it is possible to use metal such as aluminum alloy and stainless steel.

Figure 1:
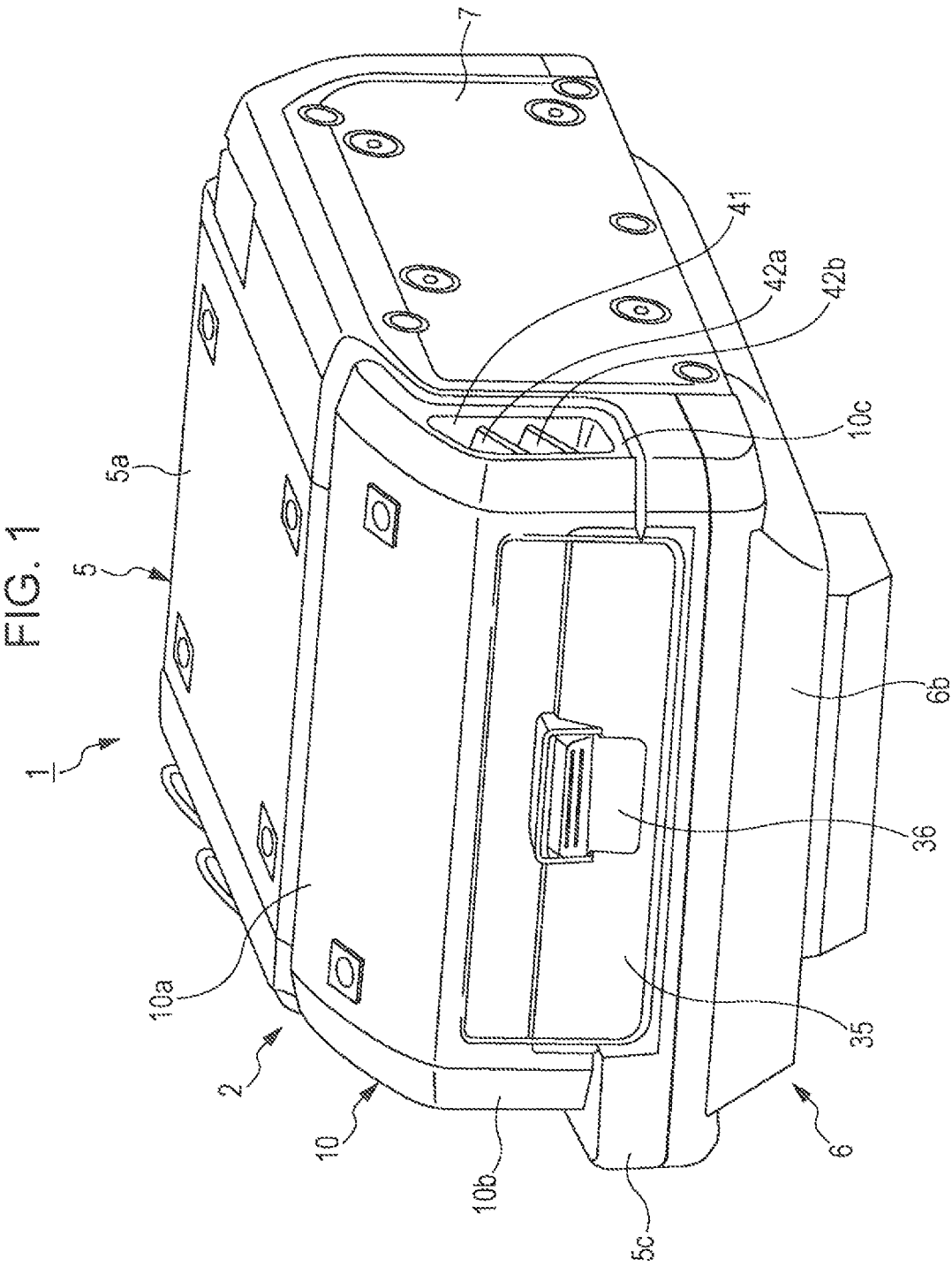
FIG. 1 is an exterior perspective view illustrating an example of a semiconductor recording medium recording and/or reproducing apparatus as viewed from the front side according to an embodiment of the present disclosure.
Figure 2:
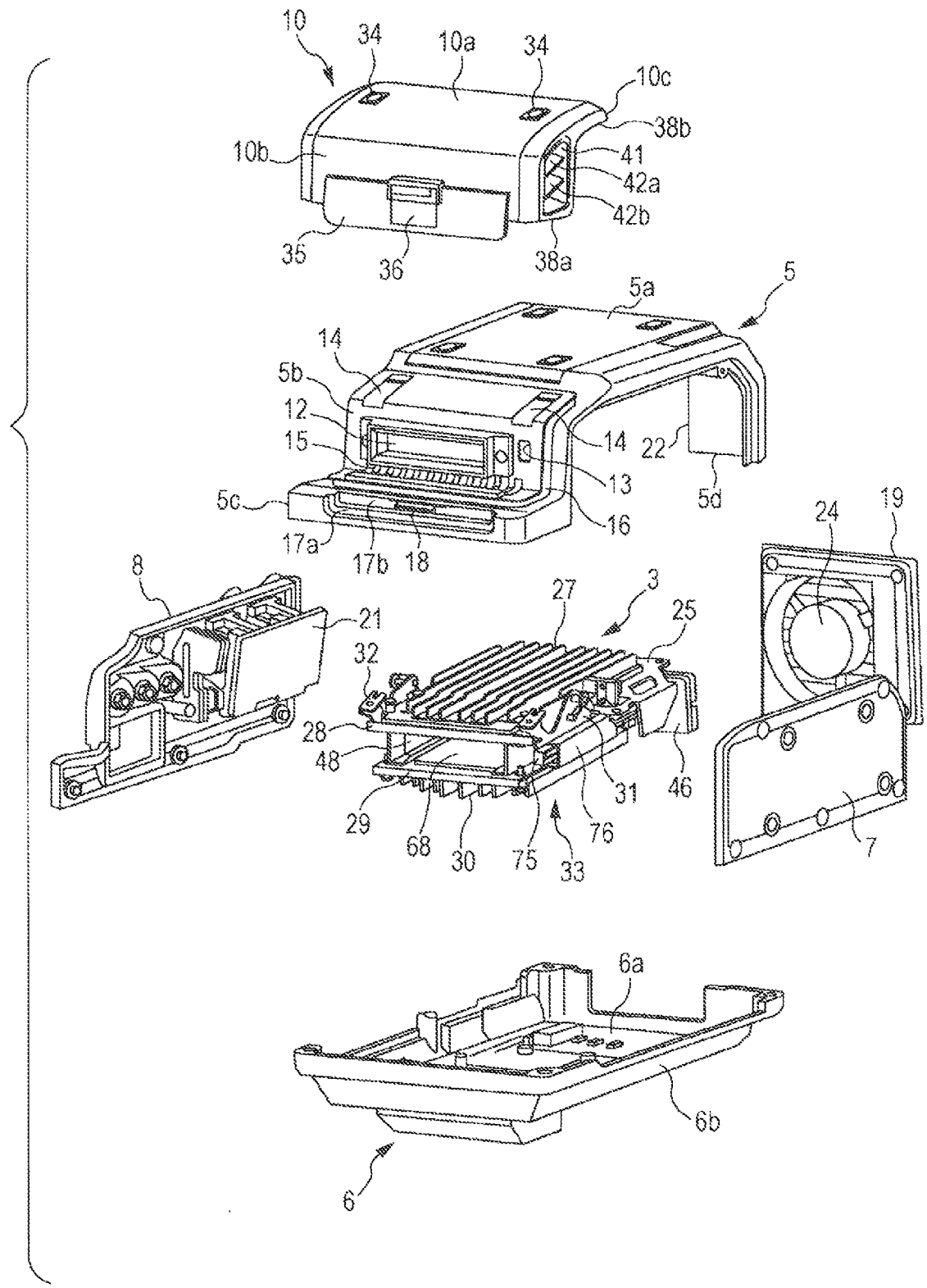
FIG. 2 is an exploded perspective view schematically illustrating constituent elements of the semiconductor recording medium recording and/or reproducing apparatus shown in FIG. 1.
Figure 3:
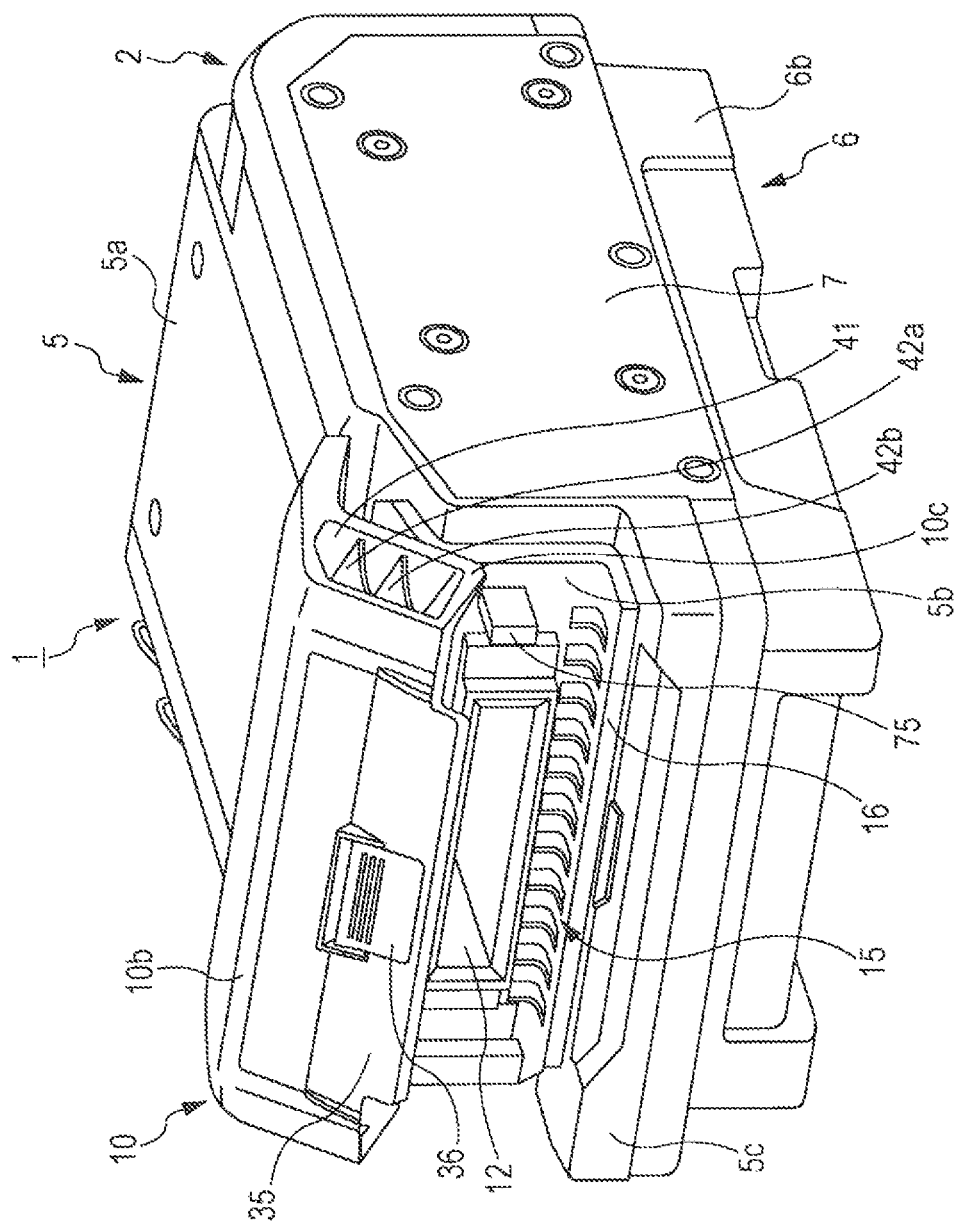
FIG. 3 is an exterior perspective view illustrating a state where an openable and closeable cover of the semiconductor recording medium recording and/or reproducing apparatus shown in FIG. 1 is opened to open a medium entrance.
Figure 4:
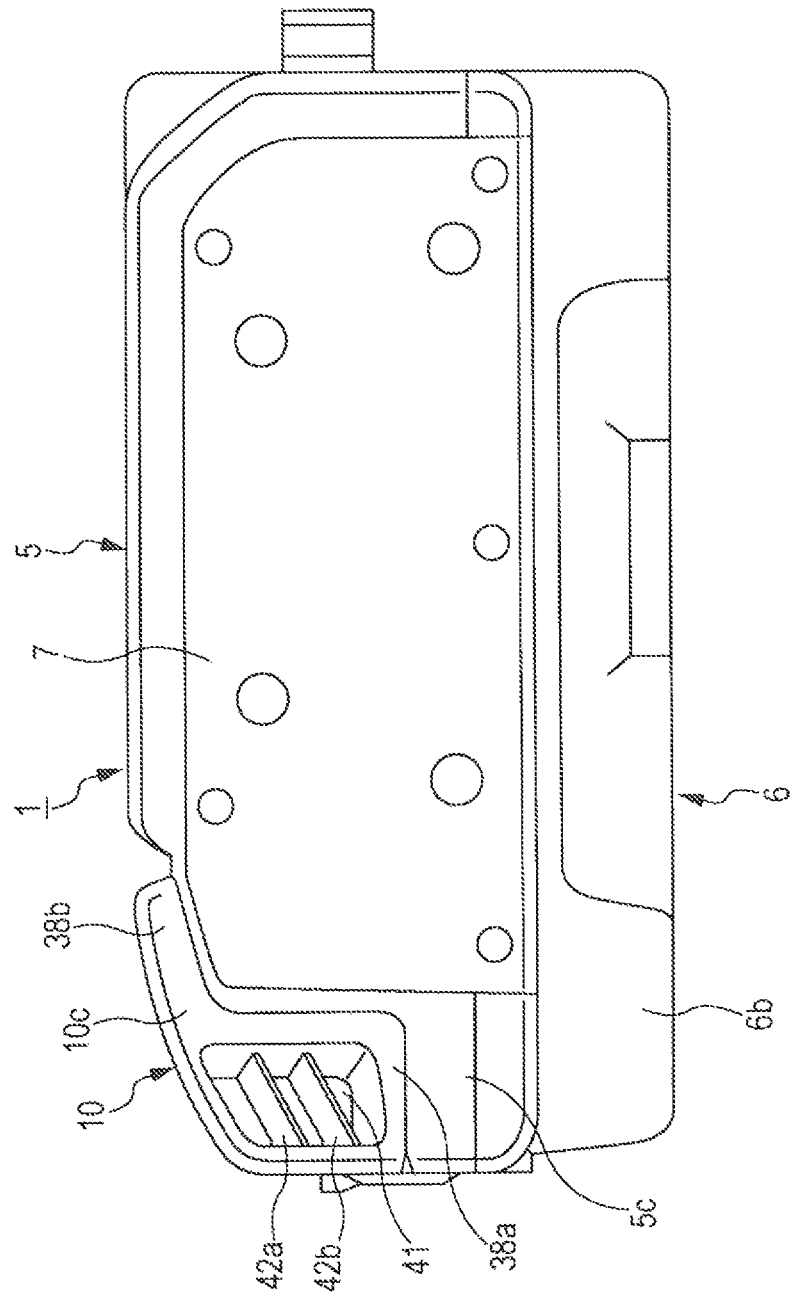
FIG. 4 is a right side view illustrating the semiconductor recording medium recording and/or reproducing apparatus shown in FIG. 1.

As shown in FIG. 2 and the like, the memory card recording and reproducing apparatus 1 includes, an exterior case 2, medium holder 3 housed in the exterior case 2, a recording and reproducing apparatus body (not shown) housed in the same exterior case 2, and the like. The exterior case 2 includes an upper case 5, a lower case 6, a left side panel 7, a right side panel 8, a back side panel 9, and an openable and closeable cover 10. However, the exterior case 2 is not limited to such a configuration, and a case having at least a member having a medium entrance and an openable and closeable cover capable of opening and closing the medium entrance can be applied as the exterior case.

As shown in FIG. 2 and the like, the upper case 5 includes an upper face portion 5a covering the upside of the medium holder 3, a front face portion 5b continuing to the front portion of the upper face portion 5a, an outrigger portion 5c continuing to the lower portion of the front face portion 5b, and a back face portion 5d continuing to the back portion of the upper face portion 5a. The upper face portion 5a is formed of a portion such as a substantially rectangular ceiling capable of covering the whole of the upper face of the medium holder 3, the front face portion 5b is provided to tail down from the front end of the upper face portion 5a, and the back face portion 5d is provided to tail down from the rear end of the upper face portion 5a. The outrigger portion 5c is provided to protrude from lower end to the front end of the upper face portion 5b.

A horizontally long medium entrance 12 for inserting and ejecting the memory card 200 is provided substantially at the center of the front face portion 5b of the upper case 5. The medium entrance 12 is formed as a rectangular opening portion slightly larger than a cross section when the memory card 200 is cut in a width direction. A rod passage hole 13 through which a leading end of an ejection rod 75 of the medium holder 3 protrudes is provided on one side of the medium entrance 12 of the front face portion 5b. A pair of arm passage holes 14 and 14 through which the leading ends of left and right lead arms 31 and 32 of the medium holder 3 protrude are provided at a part from the front face portion 5b to the upper face portion 5a. The pair of arm passage holes 14 and 14 are provided on the outer side than both ends of the medium entrance 12 in the longitudinal direction.

Figure 20:
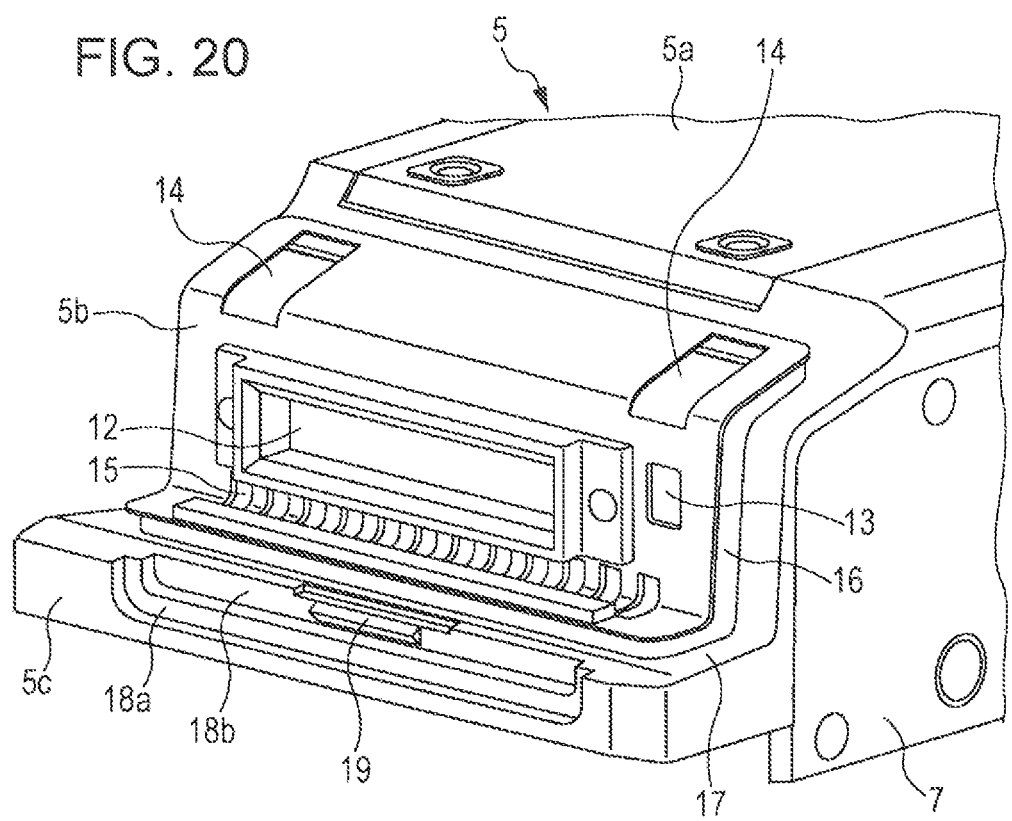
FIG. 20 is a perspective view illustrating the front side of the upper case in the semiconductor recording medium recording and/or reproducing apparatus shown in FIG. 1.
Figure 21:
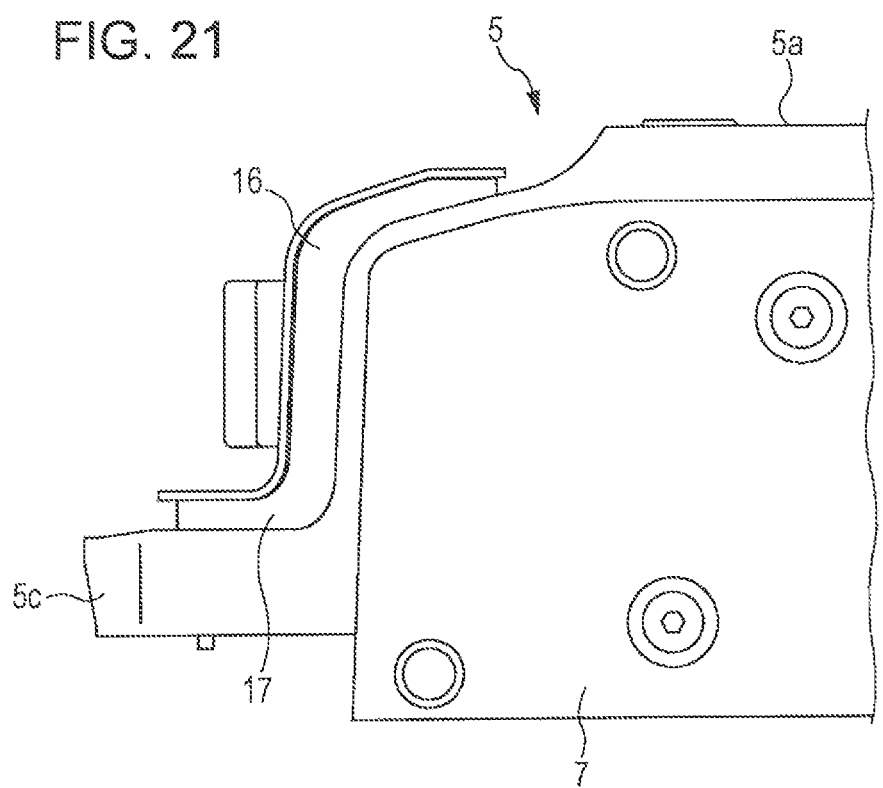
FIG. 21 is a right side view illustrating the front side of the upper case in the semiconductor recording medium recording and/or reproducing apparatus shown in FIG. 1.
Figure 22:
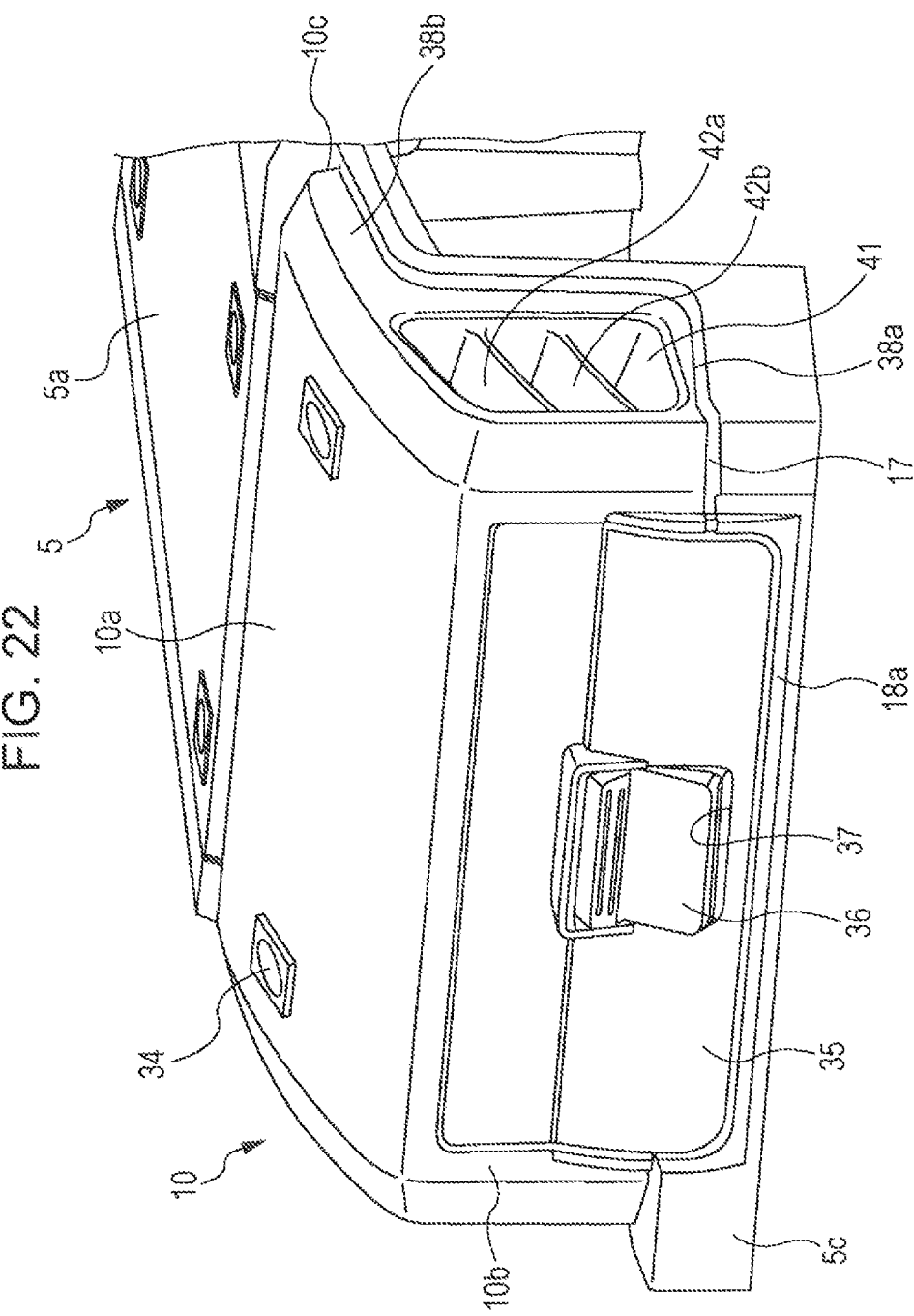
FIG. 22 is a perspective view illustrating a state where the front side of the upper case in the semiconductor recording medium recording and/or reproducing apparatus shown in FIG. 1 is closed by the openable and closeable cover.

A ventilation hole 15 for allowing a cooling external air to pass is provided under the front face portion 5b of the upper case 5. The ventilation hole 15 is formed of a plurality of slit-shaped long holes provided along the medium entrance 12, and the leading end of each long hole extend to the outrigger portion 5c. As shown in FIG. 20, FIG. 21, and the like, the front face portion 5b, a part from the front face portion 5b and the upper face portion 5a, and a part from the front face portion 5b to the outrigger portion 5c are formed such that upper faces thereof gets higher than the other part by one level. Accordingly, a level portion 16 is provided around the front end portions of the front face portion 5b and the upper face portion 5a and the inside of the outrigger portion 5c, and a water channel 17 through which water flows out is formed around the front face portion 5b and the like by the level portion 16.

Notch portions 18a and 18b formed to be notched by two levels are provided at the leading end of the outrigger portion 5c of the upper case 5. An outer notch portion 18a is provided to substantially coincide with the upper face of the openable and closeable cover 10 with the bottom thereof closed, and the leading end of the openable and closeable cover 10 engages with the inner notch portion 18b positioned therein. An engagement convex portion 19 locking the openable and closeable cover 10 is provided substantially at the center of the inner notch portion 18b.

As shown in FIG. 2 and the like, the lower case 6 covers the lower face of the upper case 5, and has a shape and a size suitable to a flat face shape of the upper case 5. The lower case 6 has a substantially rectangular lower face portion 6a, and a side face portion 6b formed to surround four directions of the lower face portion 6a. The medium holder 3 is mounted on the lower face portion 6a of the lower case 6 to change an area of a space of a medium housing unit 47. In a state where the medium holder 3 is housed in the lower face portion 6a, the upper case 5 is overlapped and combined with the upside of the lower case 6 and is attachably and detachably clamped and fixed by a plurality of fixing screws.

The left side panel 7 is formed as a plate-shaped member to close the opening portion formed on the left faces of the up and down overlapped and combined upper case 5 and lower case 6. The left side panel 7 is attachably and detachably clamped and fixed to the upper case 5 and the lower case 6 by a plurality of fixing screws. The right side panel 8 is formed as a plate-shaped member to close the opening portion formed on the right faces of the up and down overlapped and combined upper case 5 and lower case 6. The right side panel 8 is attachably and detachably clamped and fixed to the upper case 5 and the lower case 6 by a plurality of fixing screws. A connector unit 21 for electrically connecting an external device is mounted on the inner face of the right side panel 8.

Figure 5:
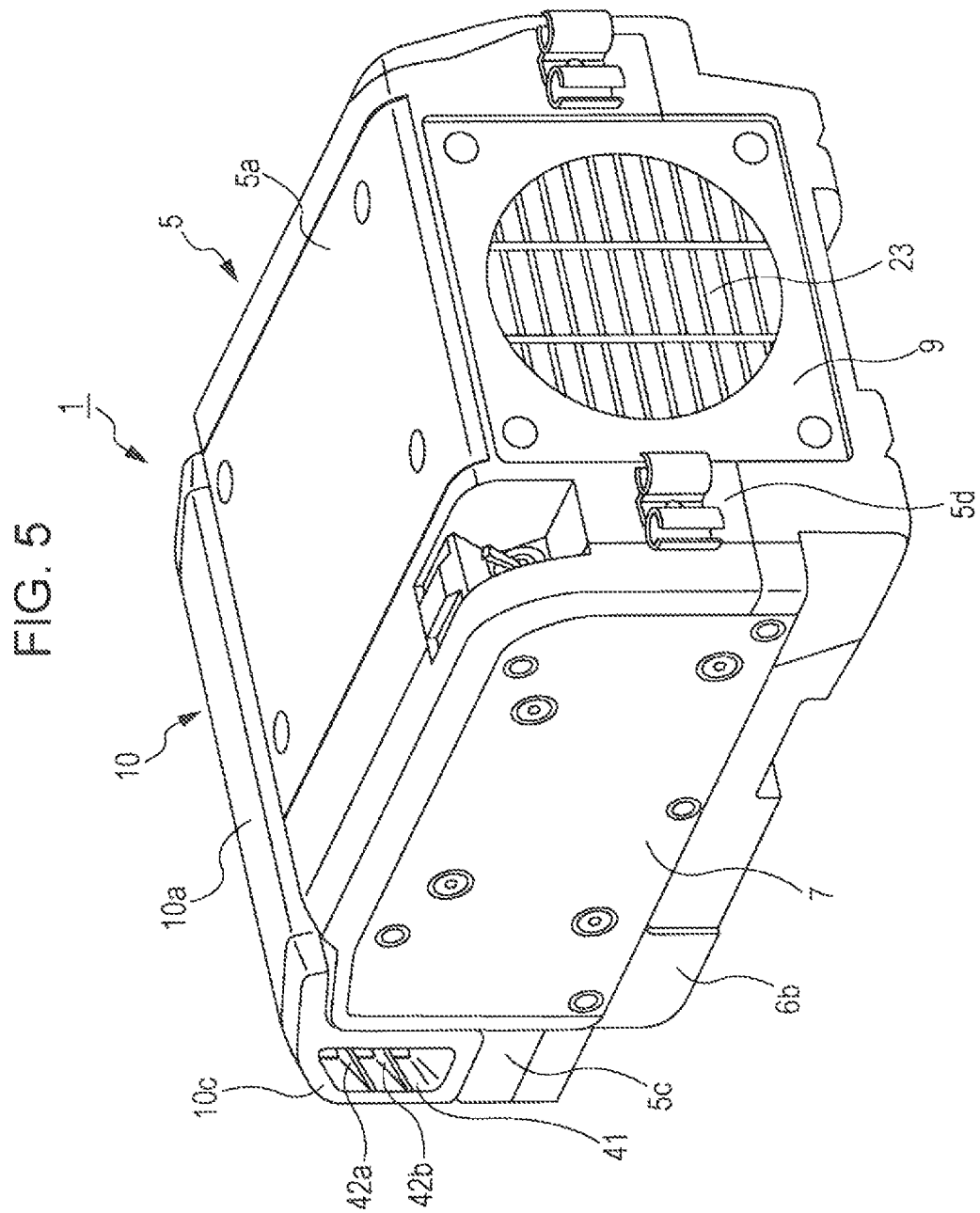
FIG. 5 is an exterior perspective view illustrating the semiconductor recording medium recording and/or reproducing apparatus shown in FIG. 1 as viewed from the back side.

The back face portion 5d of the upper case 5 and the side face portion 6b of the back side of the lower case 6 are provided with an opening portion 22 engaging with the back face panel 9. The back face panel 9 fitted into the opening portion 22 is attachably and detachably clamped and fixed to the upper case 5 and the lower case 6 by a plurality of fixing screws. As shown in FIG. 5, the back face panel 9 is provided with a ventilating opening 23 having a plurality of passage grooves. The ventilating opening 23 is provided substantially at the center of the back face panel 9, and an air exhaust fan 24 representing a specific example of the cooling fan is mounted in the ventilating opening 23.

The open and closing cover 10 has a configuration shown in FIG. 2 and FIG. 24 to FIG. 27. That is, the openable and closeable cover 10 has an upper face portion 10a covering the upside of the outrigger portion 5c of the upper case 5, a front face portion 10b continuing to the front end of the upper face portion 10a, and side face portions 10c and 10d continuing to the left and right of the upper face portion 10a and the front face portion 10b. The upper face portion 10a has a size to cover a part from the outrigger portion 5c of the upper case 5 to the front portion of the upper face portion 5a. Throughholes 34 and 34 engaging with fixing screws for fixing the leading ends of the left and right lead arms 31 and 32 are provided at both side portions in the left and right directions at the center portion in the front and back directions of the upper face portion 10a.

The front face portion 10b of the openable and closeable cover 10 is formed to fall from the front end of the upper face portion 10a to the lower portion, and a protruding portion 35 engaging with the inner notch portion 17b of the outrigger portion 5c is provided at the lower portion. The protruding portion 35 extends in the left and right directions along the lower edge of the front face portion 10b, and a concave portion 37 for accommodating a buckle 36 is provided substantially at the center portion in the longitudinal direction thereof. The buckle 36 is swingably supported by the front face portion 10b, and is urged by a spring (not shown), and a claw portion provided on the back face side protrudes to the inside of the front face portion 10b.

Figure 24:
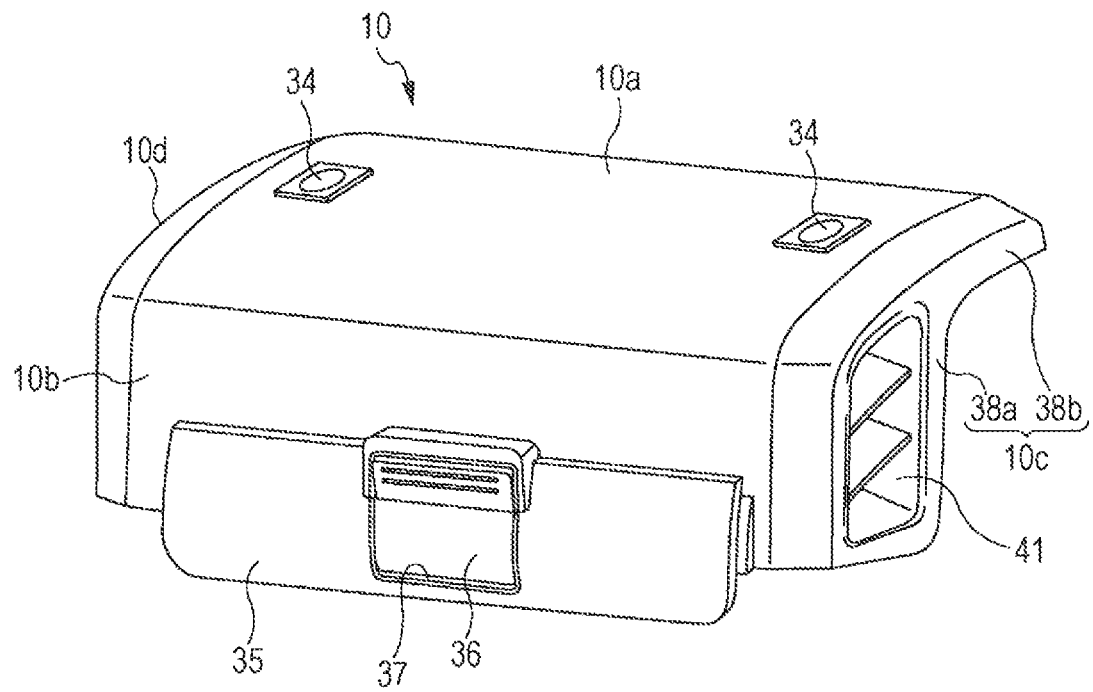
FIG. 24 is an exterior perspective view illustrating the openable and closeable cover shown in FIG. 22.
Figure 26:
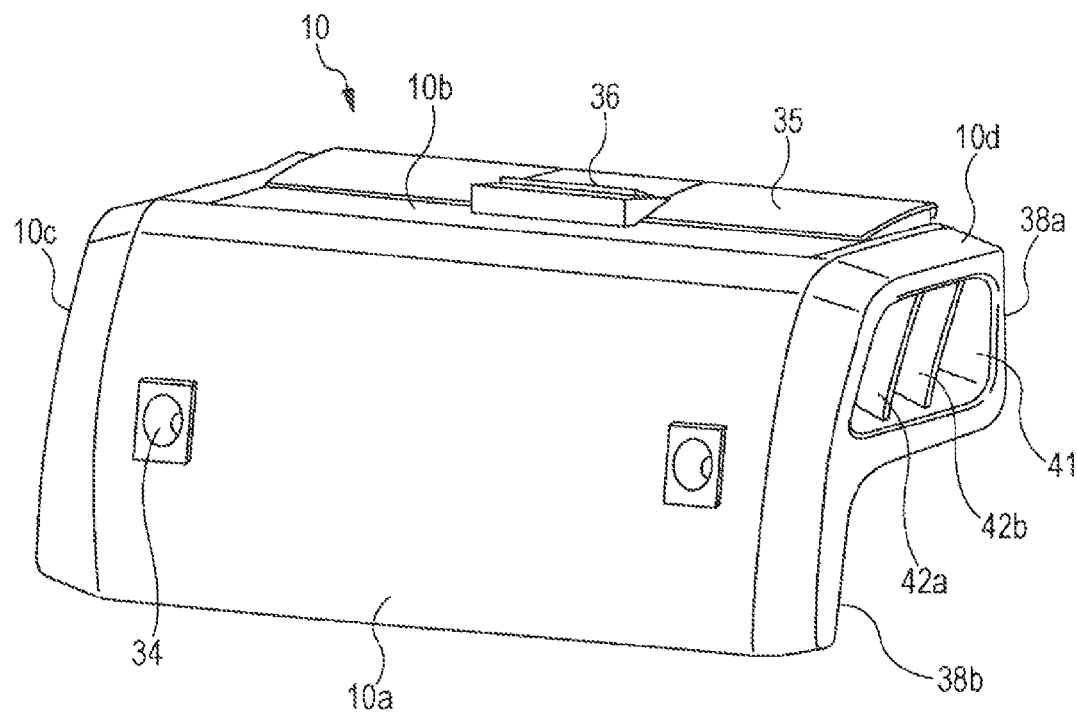
FIG. 26 is an explanatory diagram the openable and closeable cover shown in FIG. 22 as viewed from the upside.
Figure 27:
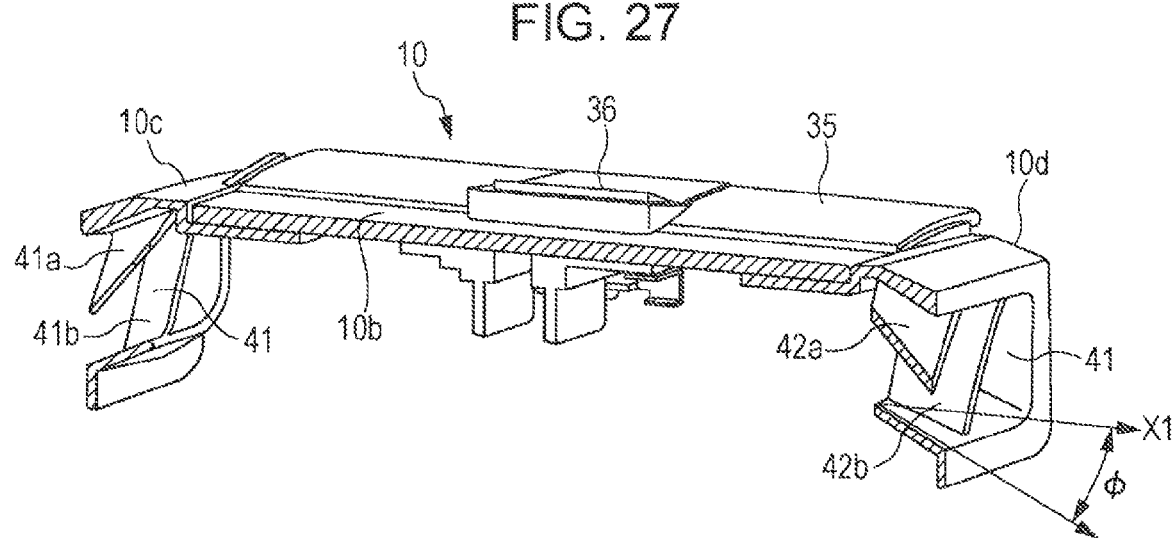
FIG. 27 is an explanatory diagram a shape of the intake vent by cutting the upside of the openable and closeable cover shown in FIG. 26.

As shown in FIG. 24, FIG. 26, and the like, the left and right face portions 10c and 10d of the openable and closeable cover 10 have shapes corresponding to the shapes of the left and right faces of the upper case 5. That is, the left and right face portions 10c and 10d are formed of a side wall 38a provided on the front side, and an upper edge 38b continuing to the upper portion of the side wall 38a and extending to the back side. A part continuing the lower face of the upper edge 38b from the lower face of the side wall 38a through the back face has a shape suitable for a shape of a part from the side portion of the outrigger portion 5c of the upper case 5 through the side portion of the front face portion 5b to the front portion of the upper face portion 5a. Accordingly, outer edge portions of the left and right side portions 10c and 10d of the openable and closeable cover 10 is overlapped with the outer edge portion of the front face 5b and the like of the upper case 5 to form a water channel 17 through which water flows out therebetween.

The side walls 38a of the left and right face portions 10c and 10d are provided with an intake vent 41 taking the external air in the exterior case 2. The intake vent 41 has a shape suitable for the shape of the side wall 38a, that is, a shape of slightly reducing the side wall 38a, and is provided to set a proper depth (width) E in the depth direction. The inner edge of the intake vent 41 is formed to overlap with the outer edge of the outrigger portion 5c. In the intake vent 41, two dripproof pieces 42a and 42b are provided to open a proper gap in the up and down direction and to hedge and take over in the front and back direction. Two drip-proof pieces 42a and 42b are widely set as a width F in the range of a depth E of the intake vent 41, and, is formed to fall forward and fall outward.

Figure 25:
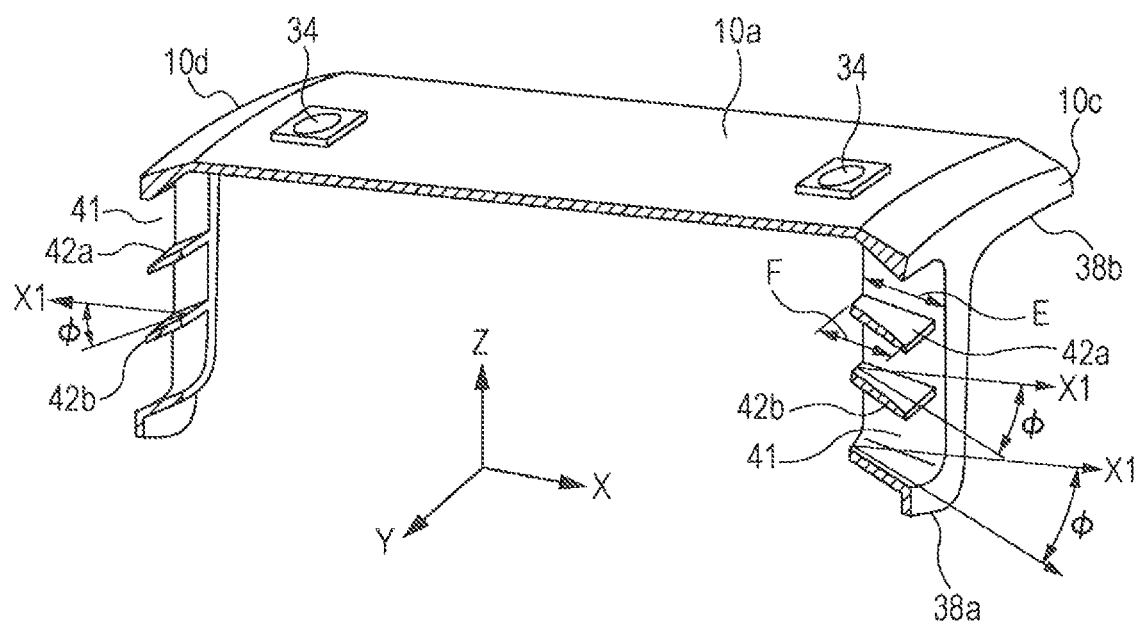
FIG. 25 is an explanatory diagram illustrating the shape of the intake vent by cutting the front side of the openable and closeable cover shown in FIG. 24.

That is, as shown in FIG. 25, when two axes of a standard face in the horizontal direction are an X axis and a Y axis and a vertical direction perpendicular thereto is a Z axis, a backward falling angle θ and an outward falling angle φ are set in two drip-proof pieces 42a and 42b. The backward falling angle (back side inclination angle) θ and the outward falling angle (outside inclination angle) φ have the following meaning. That is, when raindrops drop onto the drip-proof pieces 42a and 42b and the side wall of the intake vent 41, the waterdrops automatically flow and drip onto the outside (horizontal posture) or the back side (vertical posture) by their own weight to be discharged to the outside. It is necessary to set the back side inclination angle θ and the outside inclination angle φ considering that it is necessary to allow the much air to pass as possible as a role of the intake vent 41. Accordingly, it is preferable that the back side inclination angle θ and the outside inclination angle φ be set in the range of 15° to 35°, and the most preferable angle is 25°.

In the embodiment, the drip-proof means that it is possible to prevent inundation of raindrops when the raindrops drop by the gravity in an inclined direction of 15° with respect to a direction perpendicular to the surface of the earth. In the embodiment, the rain-proof means that it is possible to prevent inundation of raindrops when the raindrops drop by the gravity in an inclined direction of 45° with respect to a direction perpendicular to the surface of the earth. In the embodiment, for the drip-proofing, the angles described above are set as the back side inclination angle θ and the outside inclination angle φ. The angle θ is set corresponding to the usage embodiment (vertical posture) of FIG. 30, and the angle φ is set corresponding to the usage embodiment (horizontal posture) shown in FIG. 31, as two postures.

In this case, when an angle equal to or less than 15° is set as the back side inclination angle θ and the outside inclination angle φ, it is difficult to achieve the drip-proof purpose. Meanwhile, when an angle equal to or more than 35° is set as the back side inclination angle θ and the outside inclination angle φ, the drip-proof purpose is achieved, but flow resistance of the air passing through the ventilation hole 15 becomes high, which is not preferable.

As a material of the upper case 5, the lower case 6, the left side panel 7, the right side panel 8, and the back face panel 9, a plastic such as ABS is very preferable. However, the material of the members is not limited to the ABS, it is obvious to use POM and the other plastic, and metal such as aluminum alloy may be used.

Figure 6:
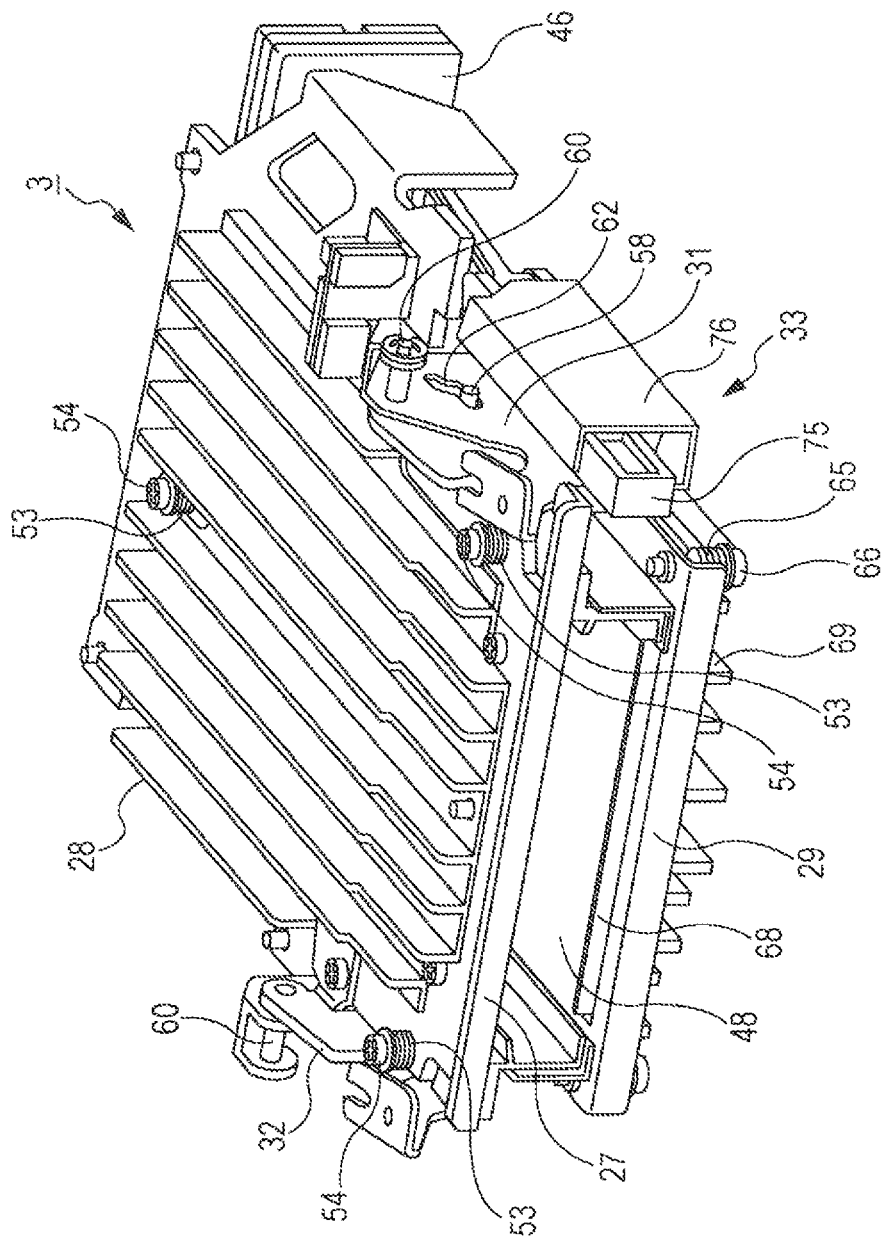
FIG. 6 is an exterior perspective view illustrating a medium holder according to the semiconductor recording medium recording and/or reproducing apparatus shown in FIG. 1.
Figure 7:
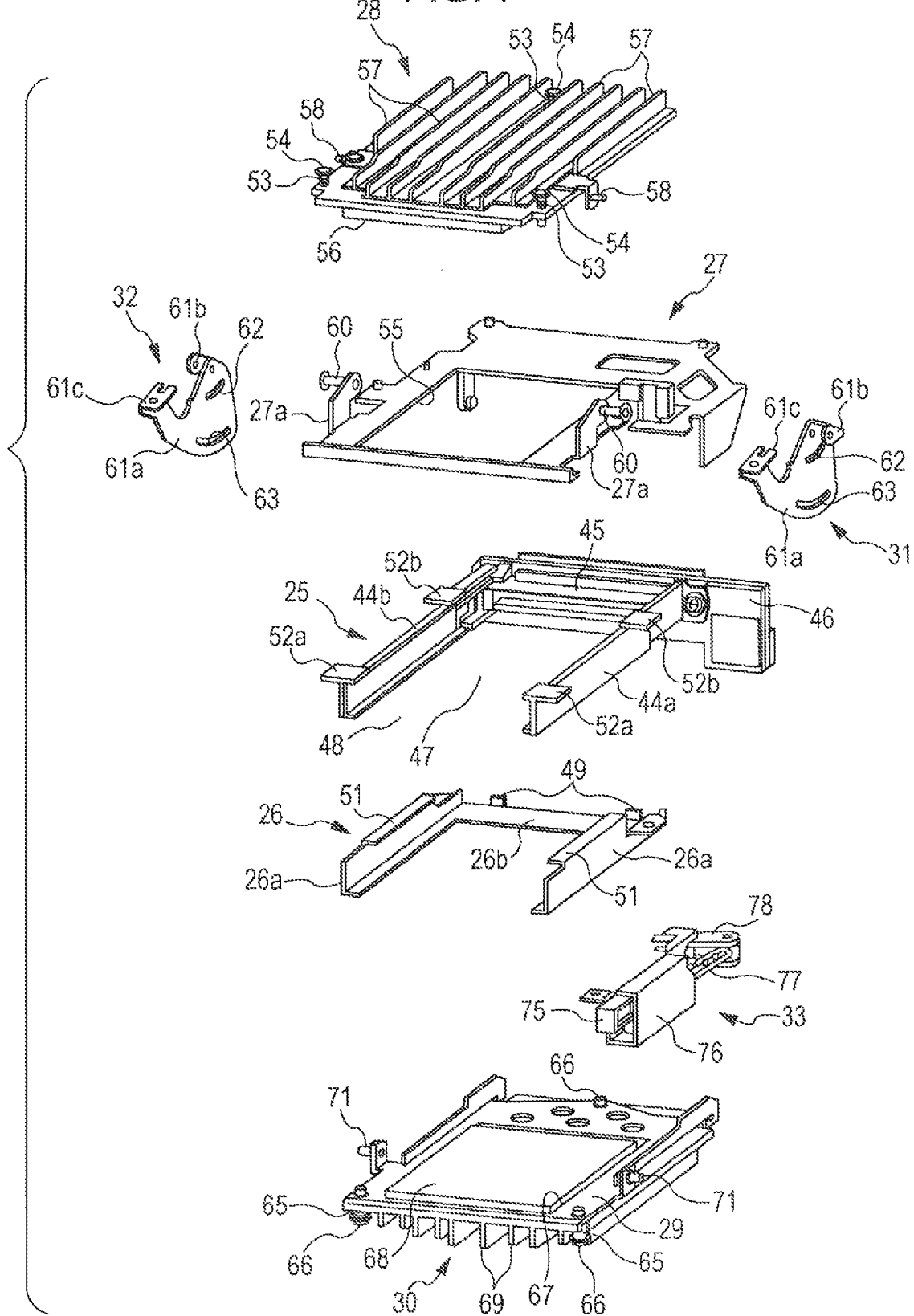
FIG. 7 is an exploded perspective view schematically illustrating constituent elements of the medium holder shown in FIG. 6.

The medium holder 3 includes a guide rail 25, a slider 26, an upper base plate 27, an upper heat sink 28, a lower base plate 29, a lower heat sink 30, a left lead arm 32, a right lead arm 31, an ejection link unit 33, and the like. As shown in FIG. 6 and FIG. 7, the guide rail 25 includes a pair of rail members 44a and 44b opposed with a predetermined gap in the left and right direction, and a connector 45 provided on the back side of the pair of rail members 44a and 44b. The connector 45 is mounted on one face of the connector wiring board 46 having a wiring pattern with a predetermined shape, and end portions of the pair of rail members 44a and 44b are fixed to the wiring board 46 by fixing screws to be integrally formed.

The pair of rail members 44a and 44b are formed by a mold material in which a cross-sectional shape is "U", and the medium housing unit 47 is formed in the pair of rail members 44a and 44b. The opposite side to the connector 45 of the medium housing unit 47 is an insertion slot 48 to and from which the memory card 200 is inserted and ejected, and the memory card 200 inserted from the insertion slot 48 is guided by concave portions of the pair of rail members 44a and 44b to be inserted and ejected to and from the medium housing unit 47. By inserting the memory card 200 to the deepest portion of the medium housing unit 47, the connection unit 203 of the memory card 200 is inserted and combined with the connector 45 that is the connection unit of the memory card recording and reproducing apparatus 1. Accordingly, the connection unit 203 of the memory card 200 and the connector 45 of the memory card recording and reproducing apparatus 1 are electrically connected to each other.

The slider 26 is provided on the outsides of the pair of rail members 44a and 44b. The slider 26 is slid to the insertion slot 48 side at the time of the ejection operation to discharge the memory card 200 by a predetermined distance. The slider 26 has a pair of frame pieces 26a and 26a opposed with a predetermined gap, and a connection piece 26b connecting both frame pieces 26a and 26a. The connection piece 26b is provided with a press piece 49 protruding to the medium housing unit 47 side, and the memory card 200 is pressed by the press piece 49 and is pushed to a predetermined position. To move the slider 26 by a predetermined distance, the pair of frame pieces 26a and 26a are provided with a movement range setting units 51 and 51.

Corresponding thereto, the pair of rail members 44a and 44b of the guide rail 25 are provided with front and back restriction pieces 52a and 52b restricting the movement distance of the slider 26. The movement range setting unit 51 of the slider 26 is interposed between the front and back restriction pieces 52a and 52b of the guide rail 25. Accordingly, the slider 26 is relatively movable with respect to the guide rail 15 by the gap set from the movement range setting unit 51 between the front and back restriction pieces 52a and 52b.

The upper base plate 27 is provided on one face (in the embodiment, the upper face) of the medium housing unit 47, and is formed by a plate-shaped member capable of covering the whole of the upper face of the medium housing unit 47. The upper heat sink 28 is mounted on the upper face of the upper base plate 27. As shown in FIG. 6 and FIG. 7, the upper heat sink 28 is urged by fixing force of a plurality of fixing screws 54 provided with a coil spring 53, and is elastically supported to the upper base plate 27. The upper base plate 27 is provided with a rectangular through-hole 55 passing between the surface and the back face thereof, and a heat receiving unit 56 of the upper heat sink 28 is fitted to the through-hole 55 at a predetermined gap.

The heat receiving unit 56 of the upper heat sink 28 is formed to protrude to the outside from the face of the upper base plate 27. Accordingly, when the upper heat sink 28 is pressed to one face of the memory card 200, the face of the upper base plate 27 does not come in contact with the face of the memory card 200, only the upper face of the heat receiving unit 56 comes in contact with the face of the memory card 200. On the opposite side to the heat receiving unit 56 of the upper heat sink 28, a plurality of heat radiation fins 57 to 57 extending in the insertion and ejection direction of the memory card 200 are provided. At the front side portion of the upper heat sink 28, a pair of cam pins 58 and 58 extending in a direction perpendicular to the insertion and ejection direction of the memory card 200 are provided.

At the front side portion of the upper base plate 27, a pair of shafts 60 and 60 extending in the horizontal direction perpendicular to the insertion and ejection direction of the memory card 200 are provided. The pair of shafts 60 and 60 are erectly provided on rising pieces 27a and 27a formed by erecting the side face portions of the upper base plate 27. The left and right lead arms 31 and 32 are individually and swingably supported to the shafts 60 and 60 provided on the pair of rising pieces 27a and 27a. The left and right lead arms 31 and 32 are provided at the positions with left and right symmetry at both side portions of the upper base plate 27 in interlock of the opening and closing operation of the openable and closeable cover 10 and the opening and closing operation of the medium holder 3.

The left lead arm 32 and the right lead arm 3.1 have substantially the same shape, and include a linearly formed linear portion 61a, a bearing portion 61b formed at a main portion of a fan of the linear portion 61a, and a connection support portion 61c continuously formed on one side of the leading end side of the linear portion 61a. The bearing portion 61b is formed by providing two faces parallel to each other in which the leading ends are bent. By supporting the bearing portion 61b by the shaft 60, the left and right lead arm 31 and 32 are swingably mounted on the upper base plate 27. A difference between the left lead arm 32 and the right lead arm 31 is that a protrusion side of the leading end portion of the bearing portion 61b is reverse, and the other configuration including a shape to be described later the same.

The connection support portions 61c of the left and right lead arms 31 and 32 are formed by bending the leading ends thereof by 90°. The connection support portions 61c come in contact with the inner face of the openable and closeable cover 10, and the openable and closeable cover 10 is fixed to the left and right lead arms 31 and 32 by fixing the contact portion with fixing screws. The linear portion 61a of the lead arms 31 and 32 represents a specific example of the cam plate. Each linear portion 61a of the lead arms 31 and 32 is provided with a first cam groove 62 and a second cam groove 63 extending in the circumferential direction with different curvature radiuses from the shaft 60 as the center.

The first cam grooves 62 and 62 of the left and right lead arm 31 and 32 swing the upper heat sink 28, and the first cam grooves 62 and 62 slidably engage with the pair of cam pins 58 and 58 provided on the upper heat sink 28. The second cam grooves 63 and 63 of the left and right lead arm 31 and 32 swing the lower heat sink 30, and the second cam grooves 63 and 63 slidably engage with the pair of cam pins 71 and 71 provided on the lower heat sink 30.

The lower base plate 29 is provided on the other face (in the embodiment, the lower face) of the medium housing unit 47, and is formed by a plate-shaped member capable of covering the whole of the lower face of the medium housing unit 47. The lower heat sink 30 is mounted on the lower face of the lower base plate 29. As shown in FIG. 6 and FIG. 7, the lower heat sink 30 is urged by fixing force of a plurality of fixing screws 66 provided with a coil spring 65, and is elastically supported to the lower base plate 29. The lower base plate 29 is provided with a rectangular through-hole 67 passing between the surface and the back face thereof, and a heat receiving unit 68 of the lower heat sink 30 is fitted to the through-hole 67 at a predetermined gap.

The heat receiving unit 68 of the lower heat sink 30 is formed to protrude to the outside from the face of the lower base plate 29. Accordingly, when the lower heat sink 30 is pressed to the other face of the memory card 200, the face of the lower base plate 29 does not come in contact with the face of the memory card 200, only the upper face of the heat receiving unit 68 comes in contact with the face of the memory card 200. On the opposite side to the heat receiving unit 68 of the lower heat sink 30, a plurality of heat radiation fins 69 to 69 extending in the insertion and ejection direction of the memory card 200 are provided. At the front side portion of the lower heat sink 30, a pair of cam pins 71 and 71 extending in a direction perpendicular to the insertion and ejection direction of the memory card 200 are provided. The pair of cam pins 71 and 71 slidably engage with the second cam grooves 63 and 63 provided in the left and right lead arms 31 and 32.

Figure 15:
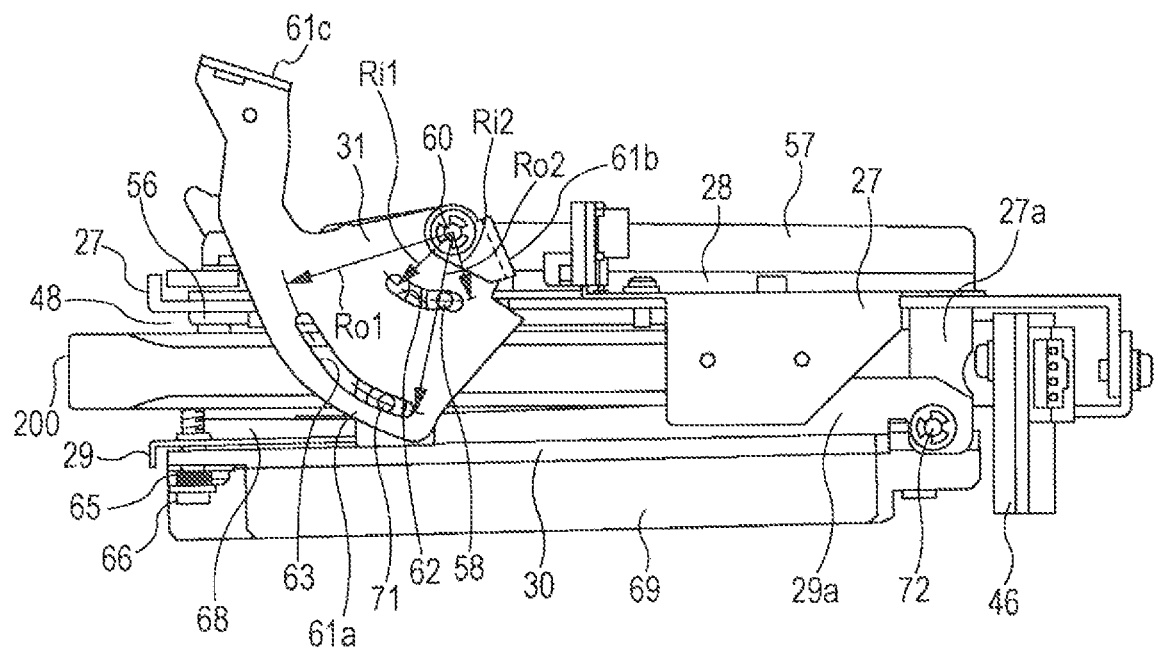
FIG. 15 is a right side view illustrating a state before the upper and lower heat sinks come in press contact with the semiconductor recording medium housed in the medium housing unit to explain an operation of the medium holder shown in FIG. 6.
Figure 16:
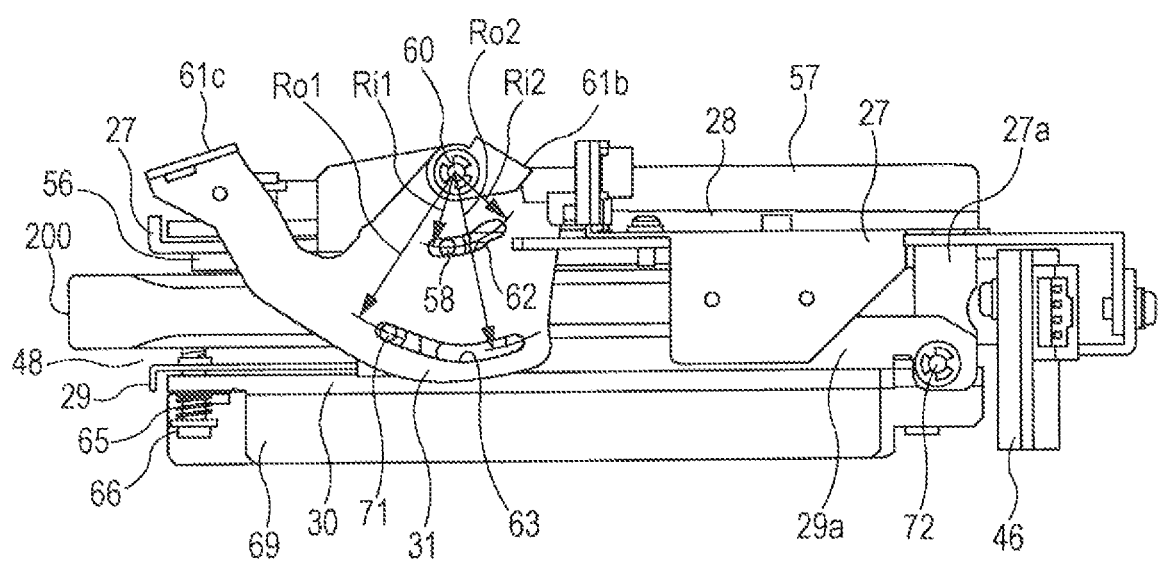
FIG. 16 is a right side view illustrating a state where the upper and lower heat sinks come in press contact with the semiconductor recording medium housed in the medium housing unit to explain an operation of the medium holder shown in FIG. 6.

As shown in FIG. 15 and FIG. 16, the first cam groove 62 is formed as a circular arc long hole extending in the circumferential direction, but a length (curvature radius) Ri from the center of the shaft 60 to the center of the long hole is continuously changed along the circumferential direction. That is, a curvature radius Ri1 of the end portion on the connection support portion 61c in the first cam groove 62 is set slightly larger than a curvature radius Ri2 of the end portion on the opposite side (Ri1>Ri2). For this reason, when the left and right lead arms 31 and 32 are swung, the length from the middle position between the first cam groove 62 and the second cam groove 63 to the first cam groove 62 is changed, and thus the upper heat sink 28 approaches and is separated with respect to the memory card 200 according to the swinging amount. The posture of the upper heat sink 28 is changed by the change (difference=Ri1−Ri2) of the curvature radius of the first cam groove 62, and thus it is possible to more greatly move the insertion slot 48 side than the opposite side.

As shown in FIG. 15 and FIG. 16, the second cam groove 63 is formed as a circular arc long hole extending in the circumferential direction, but the length (curvature radius) Ro from the center of the shaft 60 to the center of the long hole is continuously changed according to the same circumferential direction. That is, the curvature radius Ro1 of the end portion on the connection support portion 61c side in the second cam groove 63 is set slightly smaller than the curvature radius Ro2 of the end portion on the opposite side (Ro1<Ro2). For this reason, when the left and right lead arms 31 and 32 are swung, the length from the middle position between the first cam groove 62 and the second cam groove 63 to the second cam groove 63 is changed, and thus the lower heat sink 30 approaches and is separated with respect to the memory card 200 according to the swinging amount. The posture of the lower heat sink 30 is changed by the change (difference=Ro2−Ro1) of the curvature radius of the second cam groove 63, and thus it is possible to more greatly move the insertion slot 48 side than the opposite side.

The upper base plate 27 and the lower base plate 29 are swingably connected to each other by a swinging shaft 72 with respect to the end portion on the opposite side to the insertion slot 48. That is, the both left and right side portions opposite to the insertion slot 48 of the upper base plate 27 are provided with separation pieces 27a protruding to the lower heat sink 30 side. The both left and right side portions opposite to the insertion slot 48 of the lower base plate 29 are provided with bearing pieces 29a formed to be bent to the upper heat sink 28 side. On both side portions of the upper base plate 27 and the lower base plate 29, the leading end portion of the separation piece 27a and the leading end portion of the bearing piece 29a are formed to overlap with each other, and the swinging shafts 72 and 72 pass through the overlapping portions thereof. The upper base plate 27 and the lower base plate 29 are swingably connected through the pair of swinging shafts 72 and 72.

Figure 17:
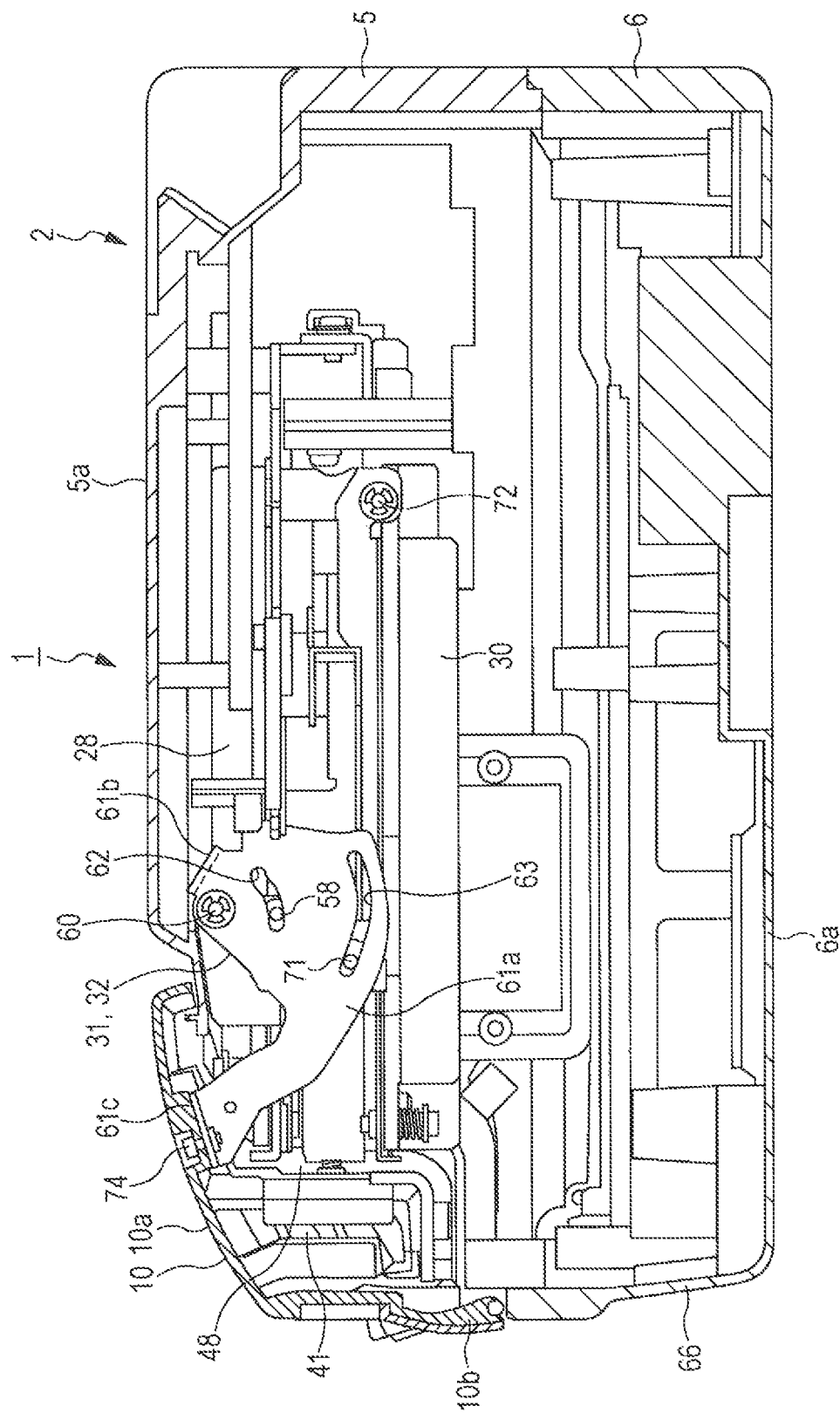
FIG. 17 is an explanatory diagram illustrating the semiconductor recording medium recording and/or reproducing apparatus shown in FIG. 1 cut along a front and back direction in a state where the openable and closeable cover is closed.
Figure 18:
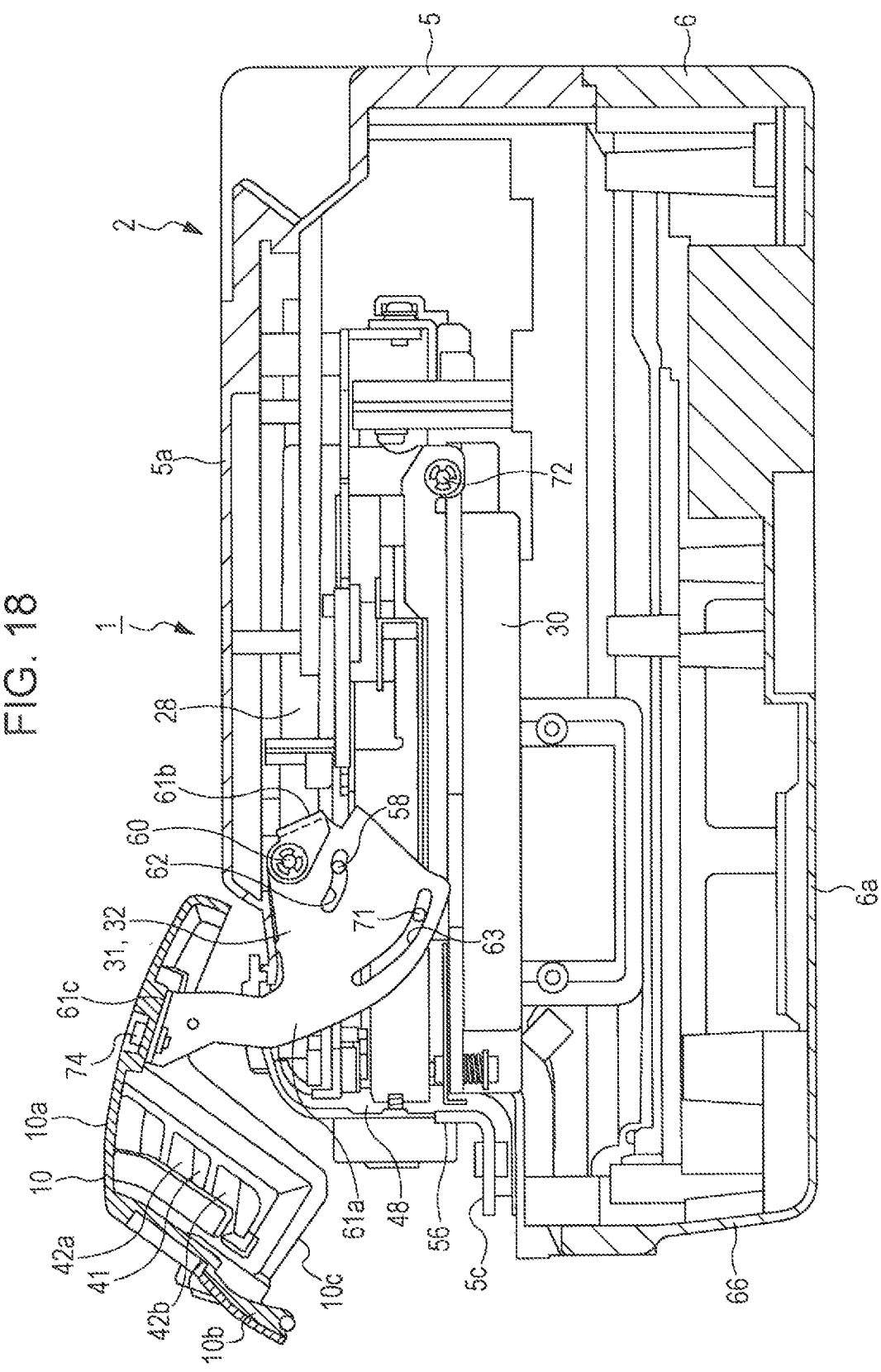
FIG. 18 is an explanatory diagram illustrating the semiconductor recording medium recording and/or reproducing apparatus shown in FIG. 3 cut along the front and back direction in a state where the openable and closeable cover is opened.
Figure 19:
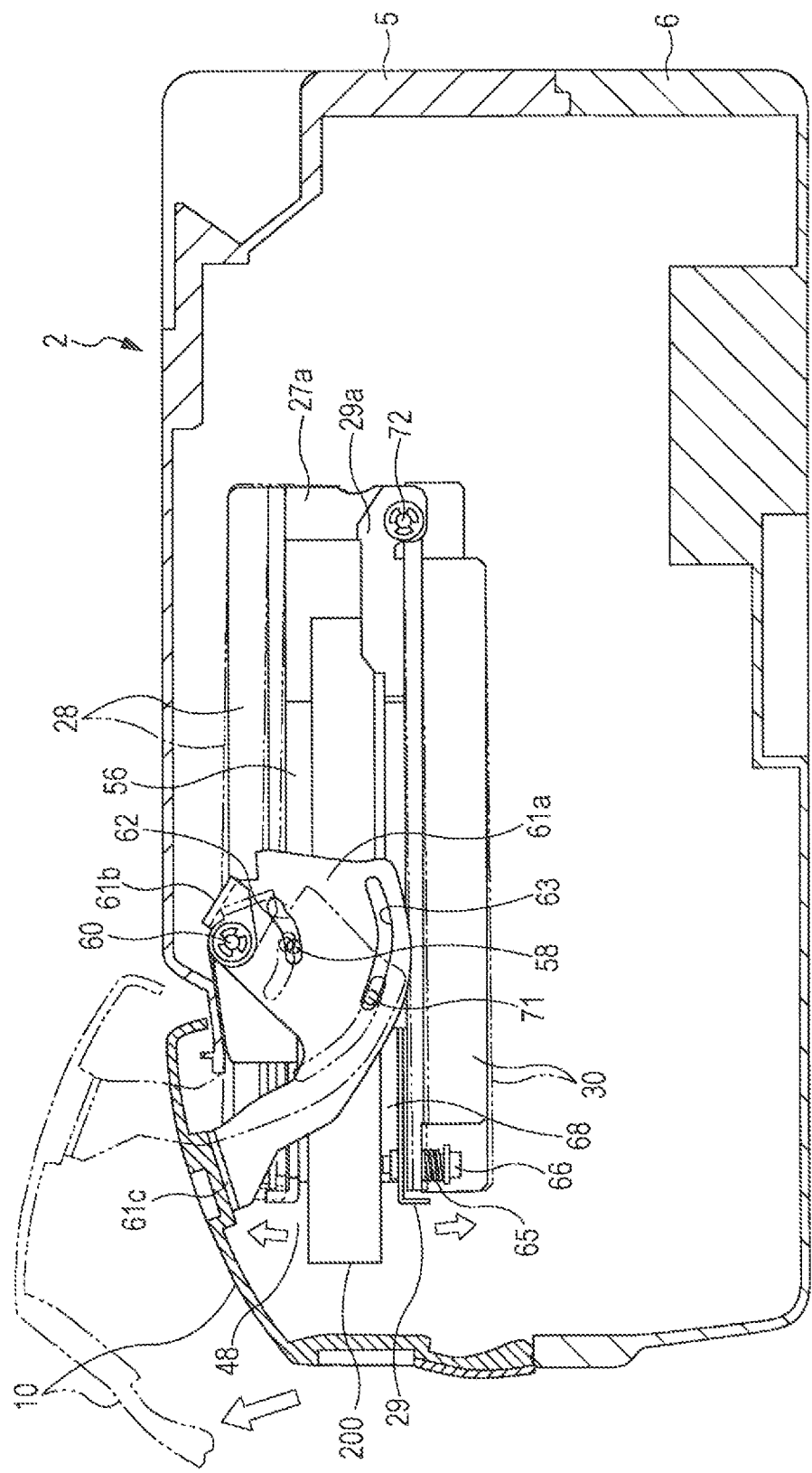
FIG. 19 is an explanatory diagram illustrating an opening and closing operation of the openable and closeable cover and a press contact and separation operation of the medium holder in the semiconductor recording medium recording and/or reproducing apparatus shown in FIG. 1.

In such a manner, as shown in FIG. 17 and FIG. 19, the first cam groove 62 of the left and right lead arms 31 and 32 guide the cam pin 58 provided on the upper heat sink 28 to swing the upper heat sink 28 in the direction (downward) getting close to the medium housing unit 47 at the time of closing the openable and closeable cover 10. The heat receiving unit 56 of the upper heat sink 28 comes in press contact with the upper face of the memory card 200 housed in the medium housing unit 47 by the spring force of the coil spring 53 mounted by the fixing screws 54. Meanwhile, as shown in FIG. 18 and FIG. 19, the first cam groove 62 guides the cam pin 58 against the spring force of the coil spring 53 to swing the upper heat sink 28 in the direction (upward) getting far from the medium housing unit 47 at the time of opening the openable and closeable cover 10. Accordingly, the heat receiving unit 56 of the upper heat sink 28 is separated from the upper face of the memory card 200, and a gap is formed between the heat receiving unit 56 and the memory card 200.

Meanwhile, as shown in FIG. 17 and FIG. 19, the second cam groove 63 of the left and right lead arms 31 and 32 guide the cam pin 71 provided on the lower heat sink 30 to swing the lower heat sink 30 in the direction (upward) getting close to the medium housing unit 47 at the time of closing the openable and closeable cover 10. The heat receiving unit 68 of the lower heat sink 30 comes in press contact with the lower face of the memory card 200 housed in the medium housing unit 47 by the spring force of the coil spring 65 mounted by the fixing screws 66. Meanwhile, as shown in FIG. 18 and FIG. 19, the second cam groove 63 guides the cam pin 71 against the spring force of the coil spring 65 to swing the lower heat sink 30 in the direction (downward) getting far from the medium housing unit 47 at the time of opening the openable and closeable cover 10. Accordingly, the heat receiving unit 68 of the lower heat sink 30 is separated from the lower face of the memory card 200, and a gap is formed between the heat receiving unit 68 and the memory card 200.

The heat sink moving unit is configured by the left and right lead arms 31 and 32 having the first cam groove 62 and the second cam groove 63, the cam pins 58 and 58 provided on the upper heat sink 28, and the cam pins 71 and 71 provided on the lower heat sink 30. The heat sink moving unit moves the upper heat sink 28 and the lower heat sink 30 to change the postures thereof in cooperation with the opening and closing operation of the openable and closeable cover 10.

As shown in FIG. 6 to FIG. 12, the ejection link unit 33 discharges the memory card 200 housed in the medium receiving unit 47. The ejection link unit 33 includes an ejection rod 75, a unit holder 76, a connection link 77, a swinging link 78, a return spring 79, and the like. The ejection rod 75 is supported slidably in the axial direction by the unit holder 76, and the rear end of the ejection rod 75 in the axial direction is swingably connected to the leading end of the connection link 77. The swinging link 78 is swingably supported by a support shaft 81 erectly provided on the guide rail 25. The support shaft 81 passes through the center portion of the swinging link 78 in the longitudinal direction, and the rear end of the connection link 77 is swingably connected to one side in the longitudinal direction.

The other side of the swinging link 78 in the longitudinal direction has a double shape having a concave portion 78a communicating with the leading end side, and the concave portion 78a engages with an operation pin 82 provided on the slider 26. A tensile coil spring applying elastic force in a tensile direction is applied to the return spring 79, one end thereof engages with the guide rail 25 and the other end engages with the slider 26 toward an axial core in the direction of inserting and ejecting the memory card 200. The slider 26 is constantly urged to the insertion slot 48 side by the spring force of the return spring 79, the movement to the front end side is prevented by the front side restriction piece 52a restricting the movement to the front side of the movement range setting unit 51.

Figure 8:
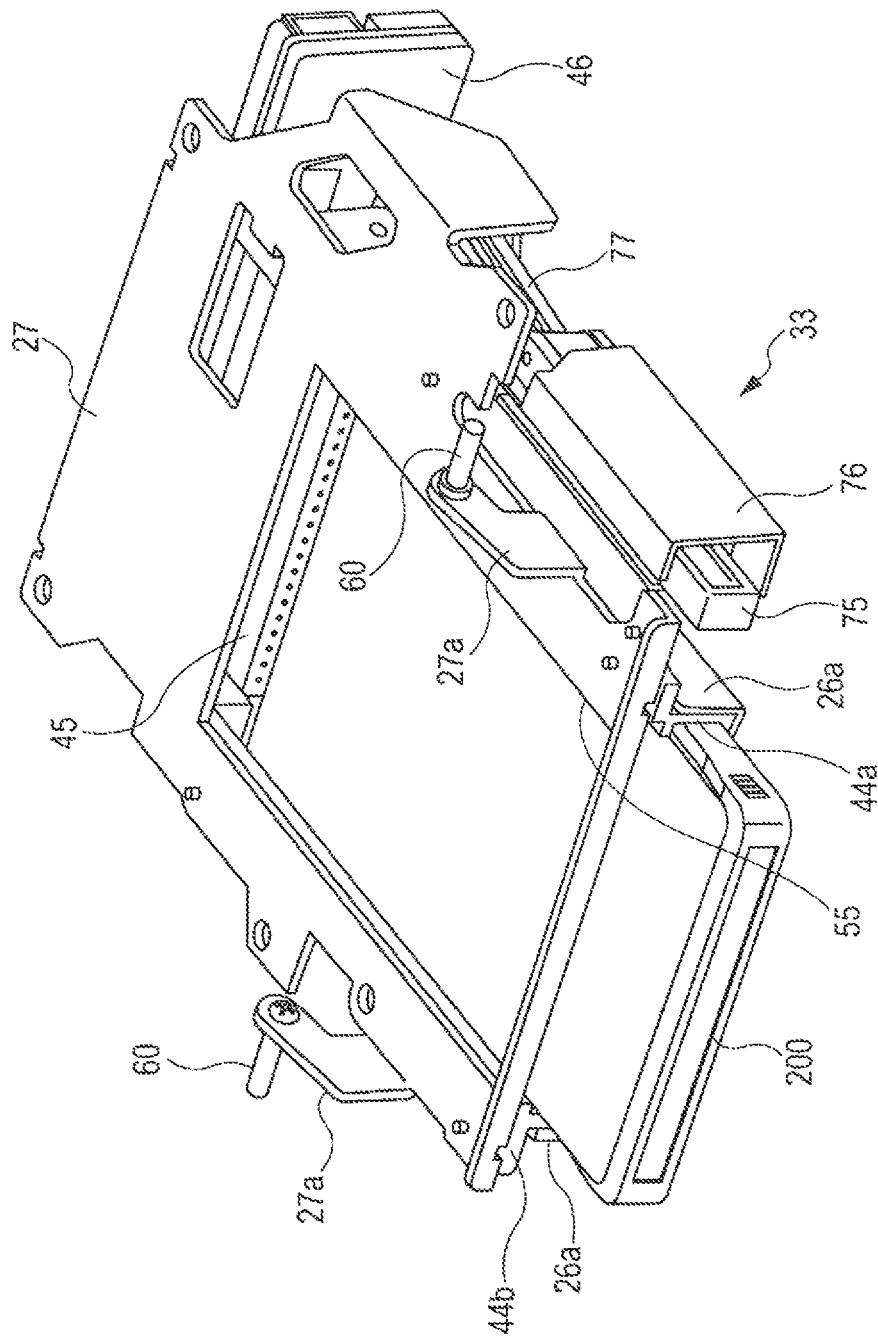
FIG. 8 is an explanatory diagram illustrating a state where upper and lower heat sinks are removed from the medium holder unit shown in FIG. 6 and the semiconductor recording medium is inserted to the midstream of the medium housing.
Figure 10:
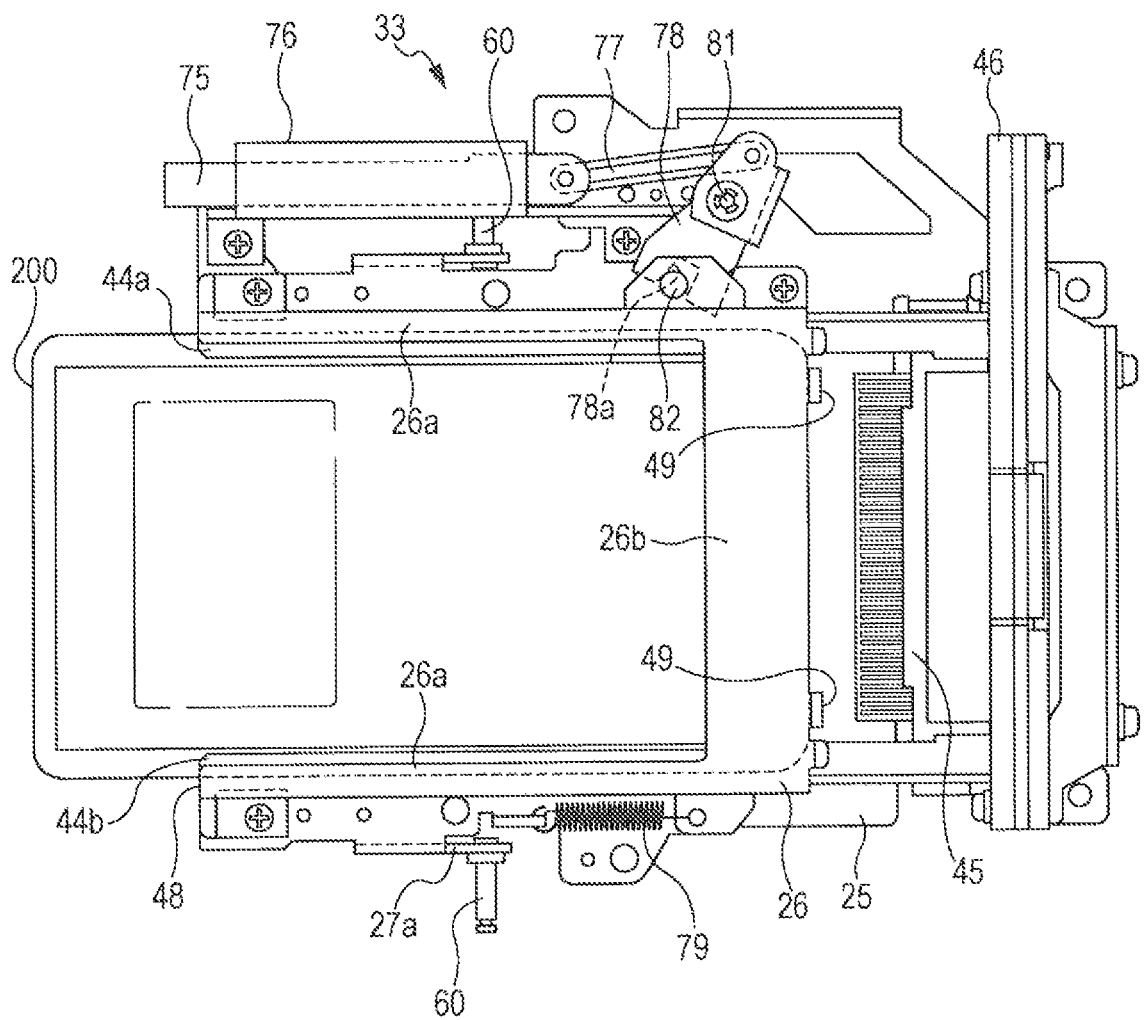
FIG. 10 is a plan view illustrating the medium holder in the state shown in FIG. 8.

FIG. 8 and FIG. 10 show a state where the connection portion 203 is not connected to the connector 45 at a position slightly before the memory card 200 is mounted at a predetermined position of the medium housing unit 47. In this state, the slider 26 is led to the insertion slot 48 side by the spring force of the return spring 79 to be at the front end position. As for the swinging link 78, the concave portion 78a of which engages with the operation pin 82, the double portion having the concave portion 78a is positioned on the front side of the support shaft 81. For this reason, the ejection rod 75 of the election link unit 33 is led to the connector 45 through the connection link 77 by the swinging link 78 to be at the retreated position. The leading end face of the ejection rod 75 is substantially flush with the upper face of the front face 5b of the upper case 5.

Figure 9:
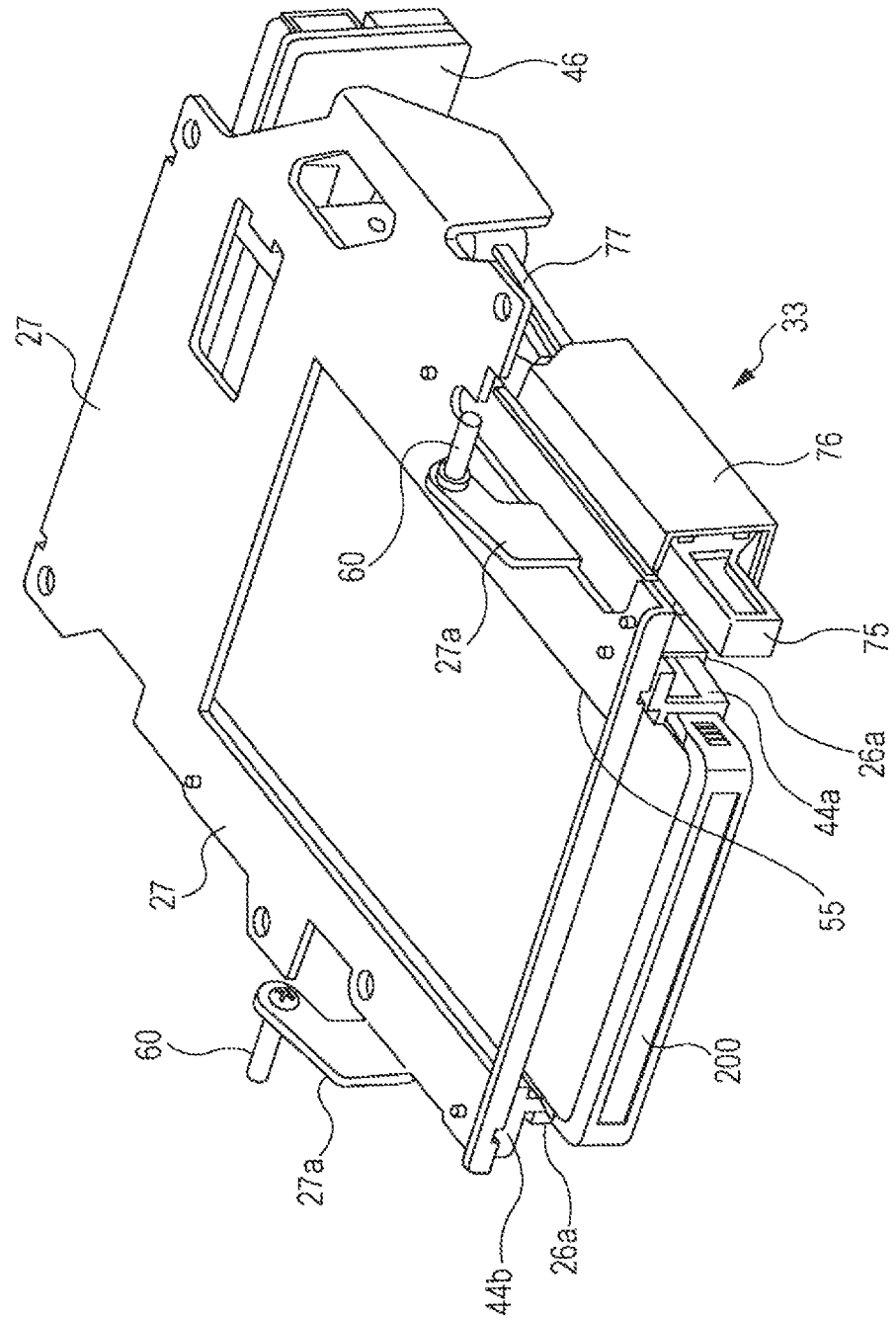
FIG. 9 is an explanatory diagram illustrating a state where the semiconductor recording medium is further inserted from the state shown in FIG. 8 and a connection unit of the semiconductor recording medium is connected to a connection unit of the semiconductor recording medium recording and/or reproducing apparatus.
Figure 11:
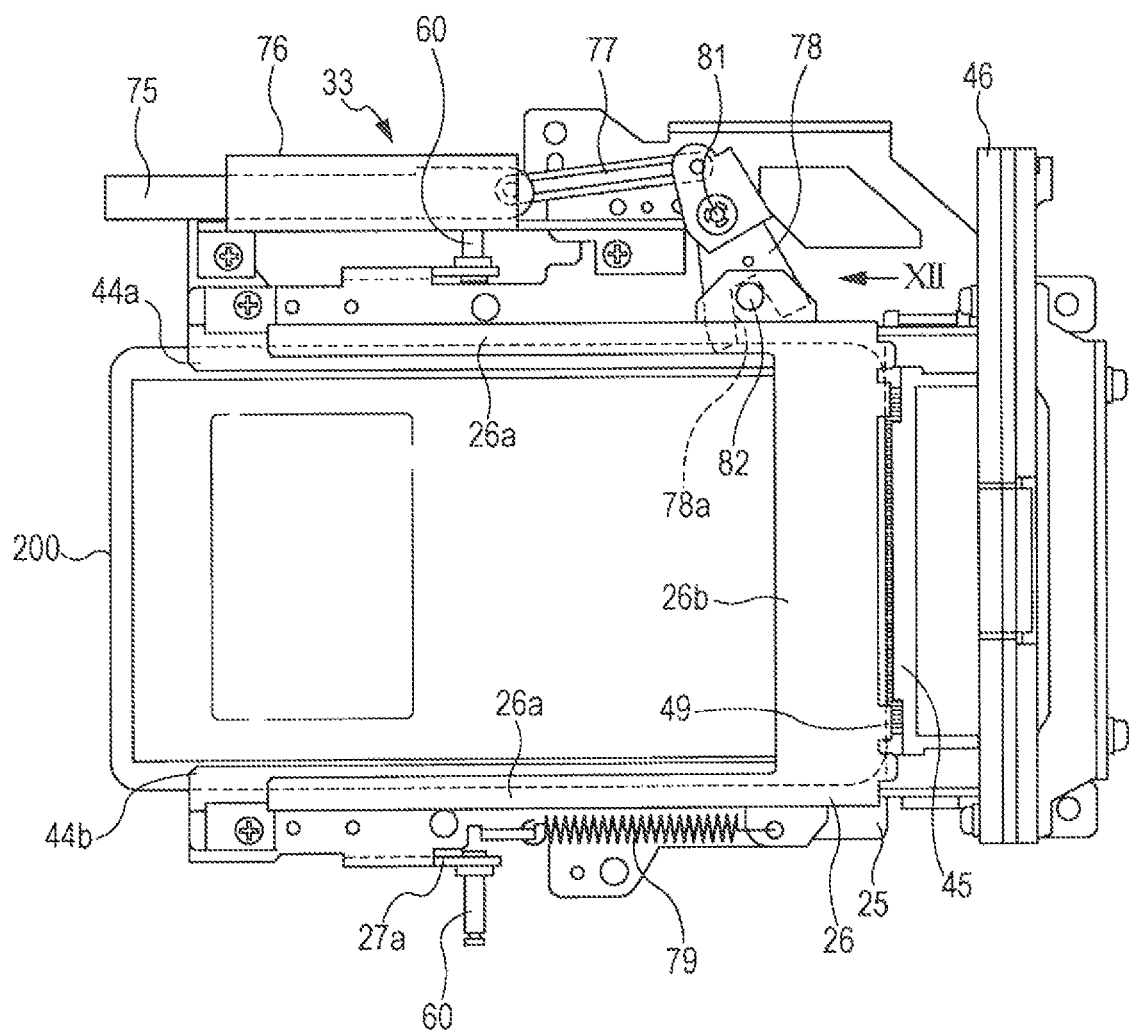
FIG. 11 is a plan view illustrating the medium holder in the state shown in FIG. 9.
Figure 12:
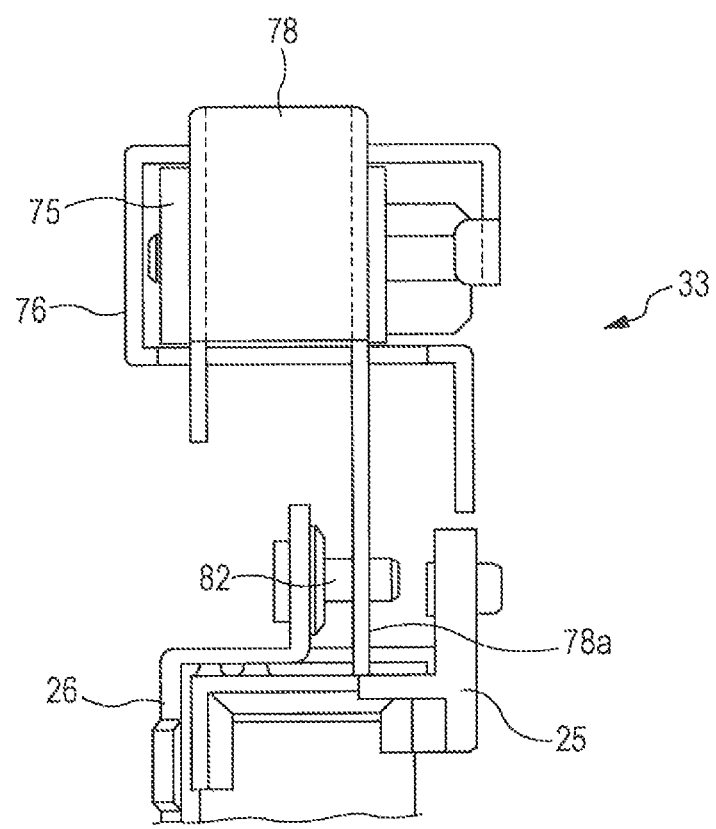
FIG. 12 is a view in a direction indicated by an arrow XII shown in FIG. 11.
Figure 13:
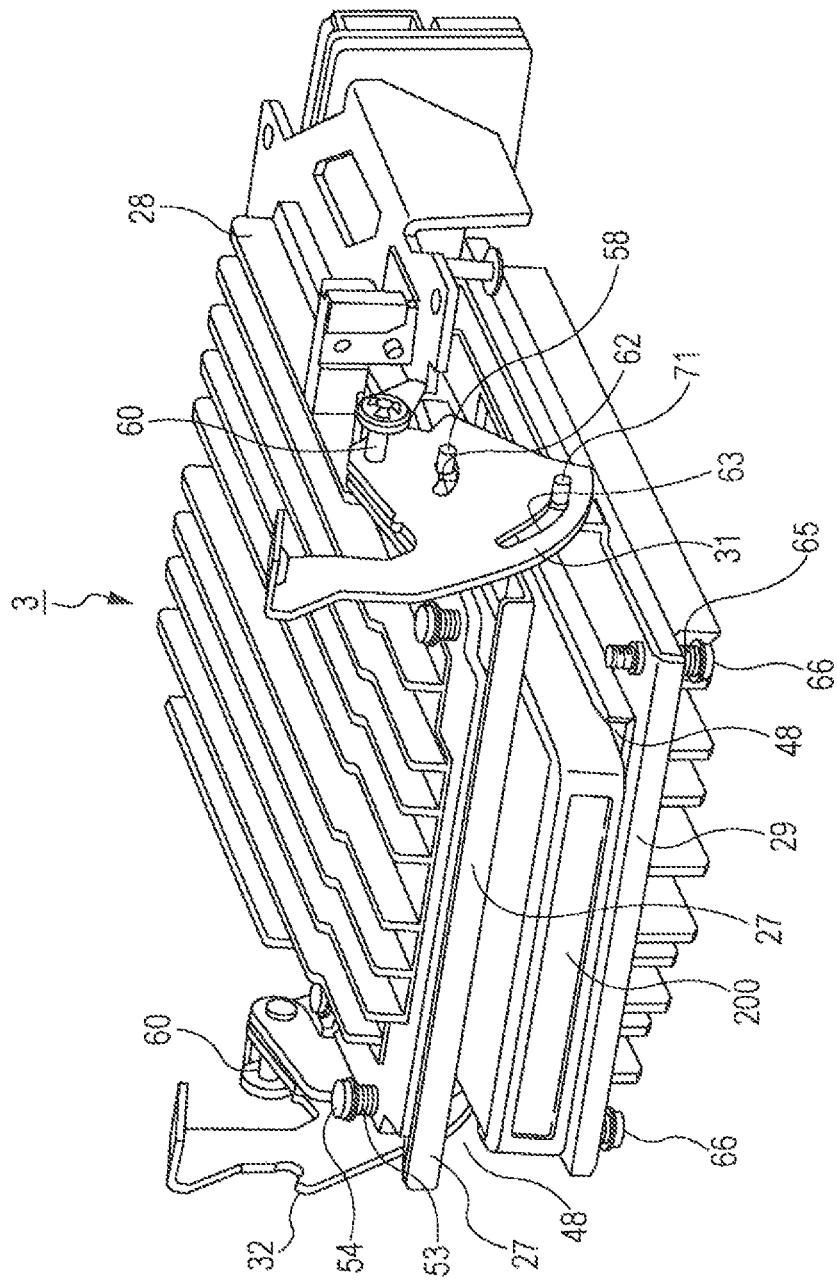
FIG. 13 a perspective view illustrating a state before the upper and lower heat sinks come in press contact with the semiconductor recording medium housed in the medium housing unit to explain an operation of the medium holder shown in FIG. 6.
Figure 14:
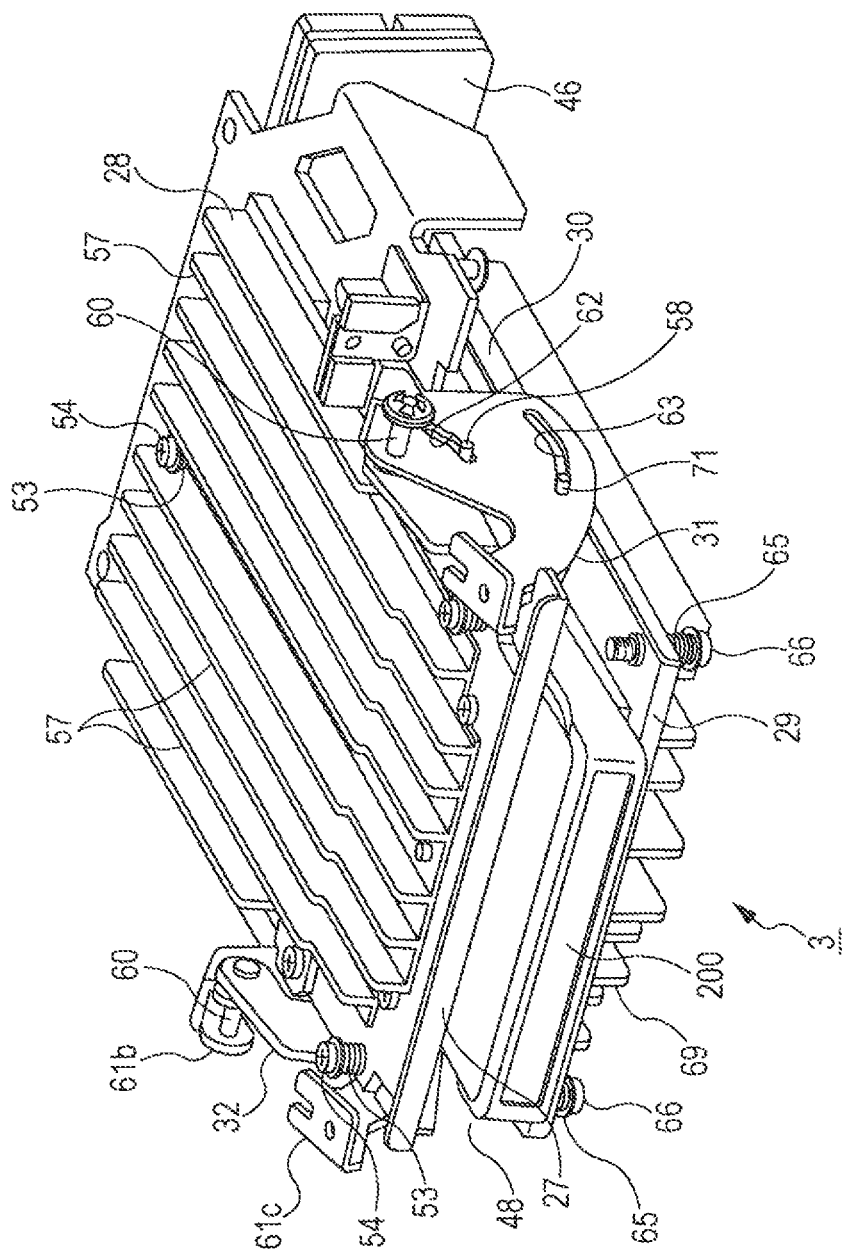
FIG. 14 is a perspective view illustrating a state where the upper and lower heat sinks come in press contact with the semiconductor recording medium housed in the medium housing unit to explain an operation of the medium holder shown in FIG. 6.

From this state, when the memory card 200 is pushed to the connector 45 side against the spring force of the return spring 79, the slider 26 pressed by the memory card 200 is integrally moved. Accordingly, as shown in FIG. 9 and FIG. 11, the connection unit 203 approaches the connector 45, the connection portion 203 is connected to the connector 45 by pushing the memory card 200 to a predetermined position, and the memory card 200 and the memory card recording and reproducing apparatus 1 are electrically connected to each other. In the connection state, the slider 26 is locked at the position by the fitting force between the connection unit 203 and the connector 45.

In this state, the concave portion 78a provided in the double portion of the swinging link 78 is positioned at the back side of the support shaft 81. For this reason, the ejection rod 75 is pushed to the insertion slot 48 side through the swinging link 78 by the connection link 77 to be at the advanced position. The leading end face of the ejection rod 75 further protrudes forward than the upper face of the front face portion 5b of the upper case 5. The protruding portion of the ejection rod 75 is pushed, and thus it is possible to perform the ejection operation of discharging the memory card 200 to the outside.

According to the memory card recording and reproducing apparatus 1 of the embodiment, for example, it is possible to perform the insertion and ejection operations of the memory card 200 in the following manner. When the memory card 200 is mounted on the memory card recording and reproducing apparatus 1, the openable and closeable cover 10 is allowed to communicate with the medium entrance 12 of the exterior case 2 by operating to open the openable and closeable cover 10. First, the buckle 36 of the openable and closeable cover 10 is pressed to release the lock of the openable and closeable cover 10, to push and open the openable and closeable cover 10 upward. Accordingly, the posture of the openable and closeable cover 10 is changed from the state shown in FIG. 17 to the state shown in FIG. 18, and the left and right lead arms 31 and 32 swing in a clockwise direction in FIG. 17 and the like with respect to the shafts 60 and 60 as the center.

In this case, the left and right lead arms 31 and 32 are provided with the first cam groove 62 and the second cam groove 63, respectively. The first cam groove 62 swingably engages the cam pin 58 of the upper heat sink 28, and the second cam groove 63 swingably engages with the cam pin 71 of the lower heat sink 30. In the first cam groove 62 and the second cam groove 63, the gap of the opposite side is set wider than the gap of the medium entrance 12 side. For this reason, it is possible to push the cam pin 58 upward by the first cam groove 62 according to the swinging amounts of the lead arms 31 and 32, and it is possible to press the cam pin 71 downward by the second cam groove 63. The upper heat sink 28 and the lower heat sink 30 are swingably connected by the swinging shaft 72 to the opposite side to the medium entrance 12 through the upper base plate 27 and the lower base plate 29.

Accordingly, as shown in FIG. 19, when the lead arms 31 and 32 are swung, the medium entrance 12 side largely communicates and the opposite swinging shaft 72 side slightly communicates with the medium housing unit 47. For this reason, it is possible to enlarge the heat receiving unit 56 of the upper heat sink 28 upward, and it is possible to enlarge the heat receiving unit 68 of the lower heat sink 30 downward. By inserting the memory card 200 from the medium entrance 12 to the medium housing unit 47, it is possible to insert the memory card 200 to the medium housing unit 47 without the sliding contact with the upper and lower heat receiving units 56 and 68. Since the medium entrance 12 side of the medium housing unit 47 is more greatly communicates than the swinging shaft 72 side, there is no worry that the upper face of the memory card 200 encounters friction with the heat receiving unit 56 of the upper heat sink 28 or the lower face encounters friction with the heat receiving unit 68 of the lower heat sink 30. Accordingly, it is possible to prevent the damage to the memory card 200 caused by the sliding contact of the face of the memory card 200 with the heat receiving units 56 and 68.

Next, the openable and closeable cover 10 is pressed from the state shown in FIG. 18, to close the medium entrance 12 of the upper case 5 with the openable and closeable cover 10 as shown in FIG. 17. In this case, the cam pin 58 integrated with the upper heat sink 28 is guided by the first cam groove 62 to be pressed downward by the swinging of the left and right lead arms 31 and 32, and thus the heat receiving unit 56 is tightly pressed to the upper face of the memory card 200. At this time, since the upper heat sink 28 is urged to the medium housing unit 47 by the coil spring 53, the upper face of the heat receiving unit 56 comes in press contact with the upper face of the memory card 200 by the urging force based on the elastic force of the coil spring 53. Accordingly, the heat generated on the upper face of the memory card 200 is reliably absorbed by the upper heat sink 28, and it is possible to radiate the heat to the outside.

The cam pin 71 integrated with the lower heat sink 30 is guided by the second cam groove 63 to be pushed upward by the swinging of the left and right lead arms 31 and 32, and thus the heat receiving unit 68 is tightly pressed to the lower face of the memory card 200. At this time, since the lower heat sink 30 is urged to the medium housing unit 47 by the coil spring 65, the upper face of the heat receiving unit 68 comes in press contact with the lower face of the memory card 200 by the urging force based on the elastic force of the coil spring 65. Accordingly, the heat generated on the lower face of the memory card 200 is reliably absorbed by the lower heat sink 30, and it is possible to radiate the heat to the outside.

Next, when the memory card 200 housed in the medium housing unit 47 is ejected, the ejection rod 75of the ejection link unit 33 is pressed. When the ejection rod 75 is pressed, the force is transmitted to the swinging link 78 through the connection link 77, and the swinging link 78 is swung with respect to the support shaft 81 as the center. At this time, the spring force of the return spring 79 is added to the swinging force of the swinging link 78, and the swinging link 78 is swung with respect to the support shaft 81 as the center to move the slider 26 to the front insertion slot 48 side. Accordingly, the press piece 49 provided on the slider 26 presses the memory card 200 forward to push the memory card 200 to a predetermined position. As a result, a part of the memory card 200 is ejected from the medium entrance 12 to be a state where it is possible to catch the memory card 200. By drawing the protruding portion of the memory card 200 out, it is possible to eject the memory card 200 from the memory card recording and reproducing apparatus 1.

Figure 28:
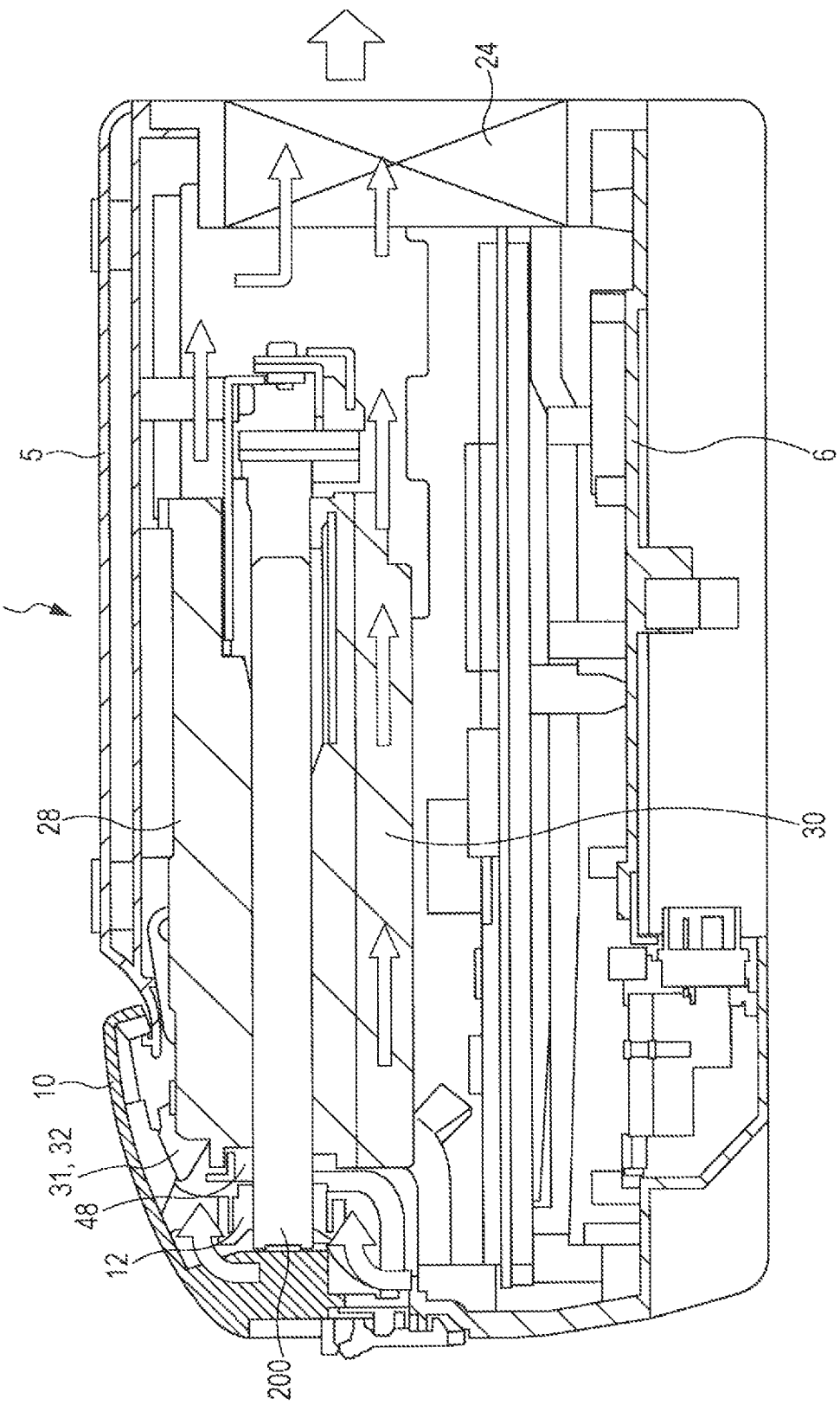
FIG. 28 is an explanatory diagram flow of cooling air by cutting the semiconductor recording medium recording and/or reproducing apparatus shown in FIG. 1 in the front and back direction.

The memory card recording and reproducing apparatus 1 can compulsorily cool the memory card 200 by allowing the external air to pass through the inside of the exterior case 2 by driving the exhaust fan 24. FIG. 28 shows a cooling structure by the exhaust fan 24. The exhaust fan 24 is provided substantially at the center of the back face portion 5d of the exterior case 2, and the medium holder 3 is provided in the front thereof. The medium holder 3 is provided with the upper heat sink 28 and the lower heat sink 30 with the memory card 200 interposed from the upside and the downside, and the upper and lower heat sinks 28 and 30 are provided with a plurality of heat radiation fins 57 and 69 extending in a linear shape in the front and back direction.

For this reason, when the exhaust fan 24 is operated, the internal pressure of the exterior case 2 is decreased such that the external air is introduced from the intake vent 41 provided, on the side face portions 10c and 10d of the openable and closeable cover 10 to the front face portion 5d of the upper case 5. The air introduced to the front face portion 5b flows from the ventilation hole 15, the arm passage hole 14, and the like provided in the upper case 5 into the upper case 5. The air flows from the space among the plurality of radiation fins 57 provided on the upper heat sink 28 backward on the upper face side of the memory card 200, and the air flows from the space among the plurality of radiation fins 69 provided on the lower heat sink 30 backward on the lower face side of the memory card 200. The air passes through the exhaust fan 24 and is discharged to the outside, and the heat collected by the upper heat sink 28 and the lower heat sink 30 is discharged to the external air.

Figure 23:
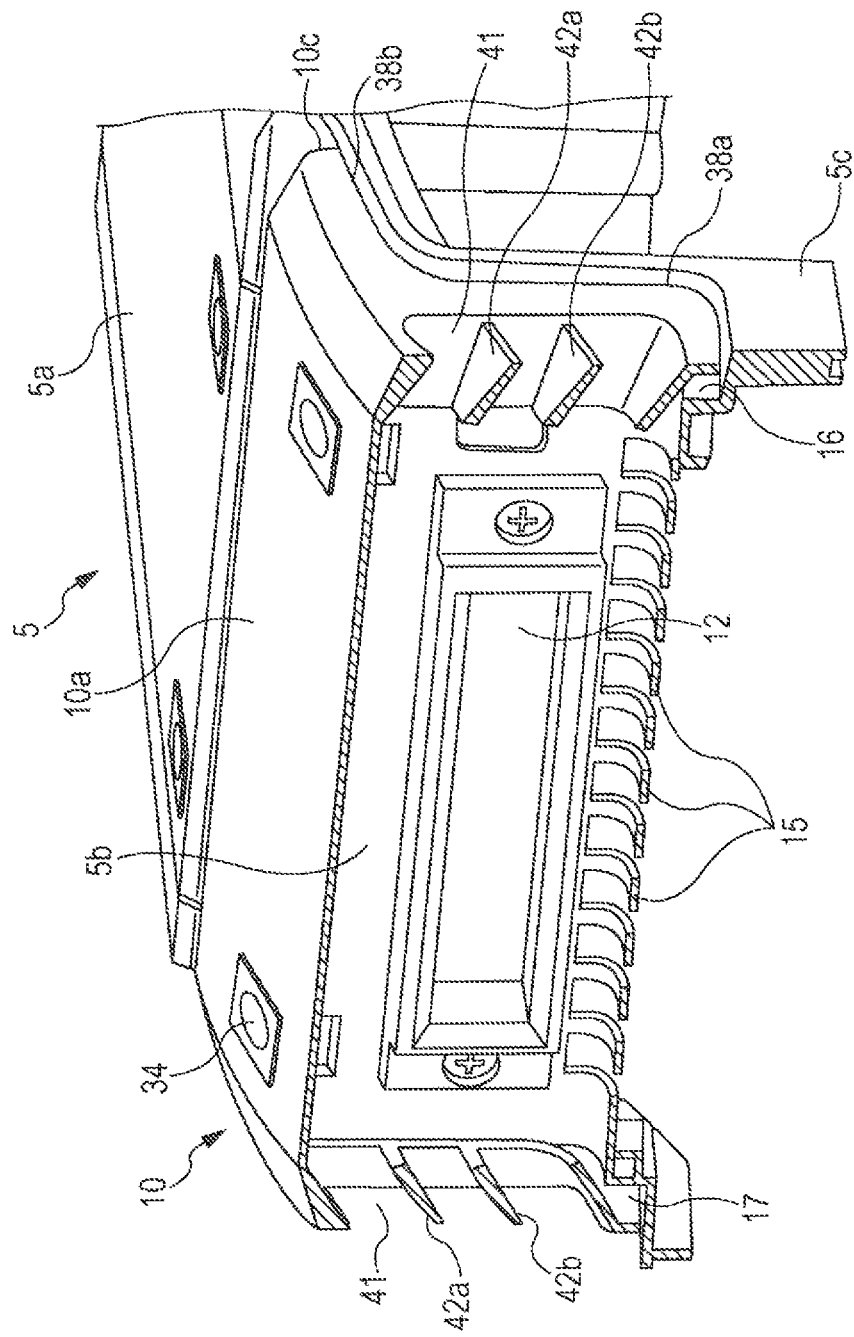
FIG. 23 is an explanatory diagram illustrating an intake vent and a ventilation hole by cutting the upper case and the front side of the openable and closeable cover shown in FIG. 22.

In this case, in the exterior case 2, since the passage of the cooling air is formed in a linear shape in the forward and backward direction parallel to the direction of inserting and ejecting the memory card 200, it is possible to prevent the air from staying in the exterior case 2. For this reason, it is possible to rapidly and effectively perform the heat radiation from the memory card 200, and it is possible to suppress the damage to the memory card 200 caused by the heat. The intake vent 41 is provided with the drip-proof pieces 42a and 42b, and the drip-proof pieces 42a and 42b and the intake vent 41 is provided with the back side inclination angle θ and the outside inclination angle φ with the angle in the inclination angle, thereby having a depth. For this reason, the drip-proof effect is exhibited, and thus it is possible to effectively prevent the inundation of raindrops dropping at the angle of about 15°. As shown in FIG. 23, the front face portion 5b of the upper case 5 is provided with the level portion 16, and the level portion 16 and the inner portion of the drip-proof pieces 42a and 42b are overlapped to provide the water channel 17 through which waterdrops flow out to the outside of the level portion 16. Accordingly, it is possible to exhibit the drip-proof function only by the shapes of the upper case 5 and the openable and closeable cover 10 without using an airtight device such as a packing.

Figure 30:
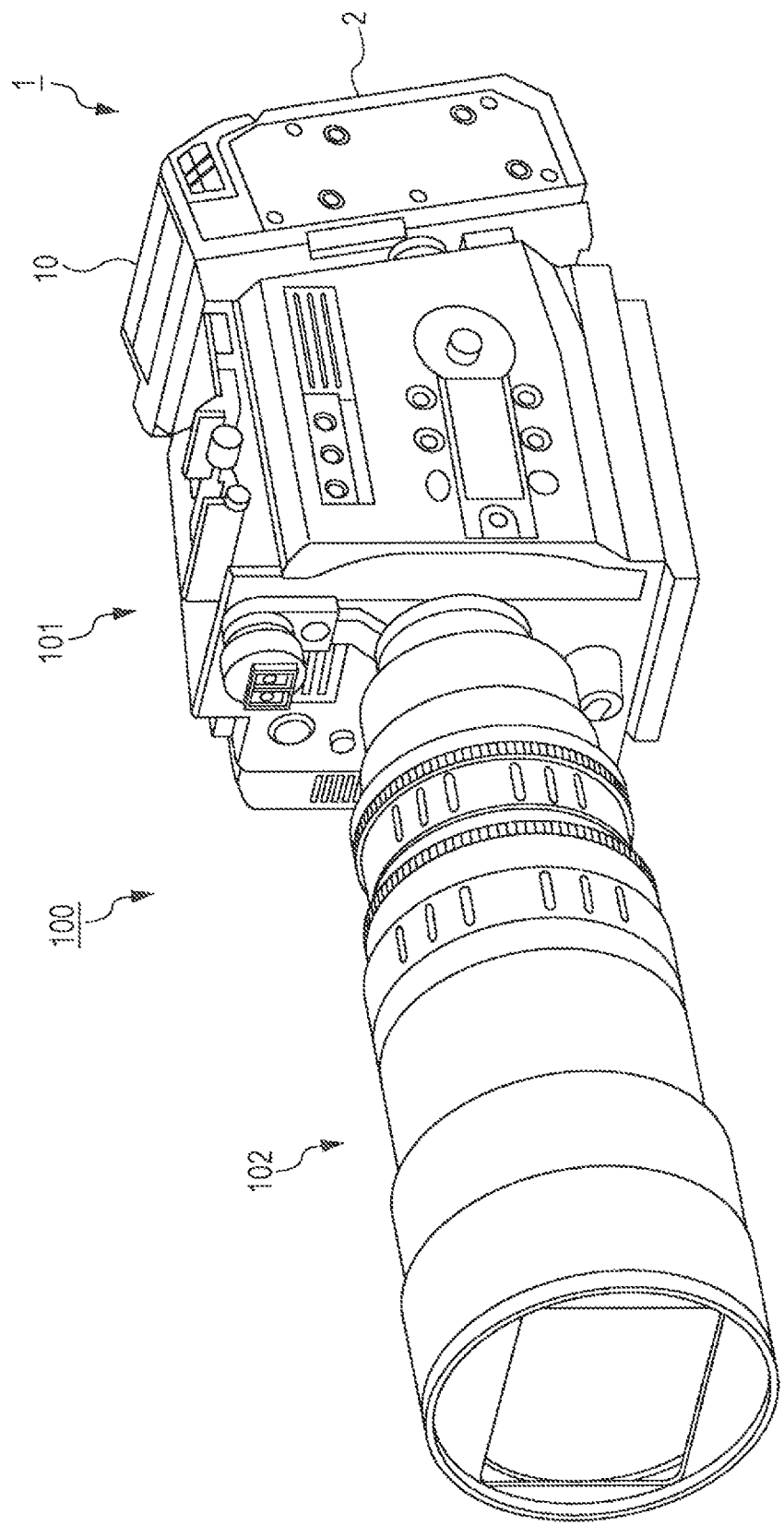
FIG. 30 is a perspective view illustrating a first usage embodiment of an electronic apparatus to which the semiconductor recording medium recording and/or reproducing apparatus shown in FIG. 1 is applied.
Figure 31:
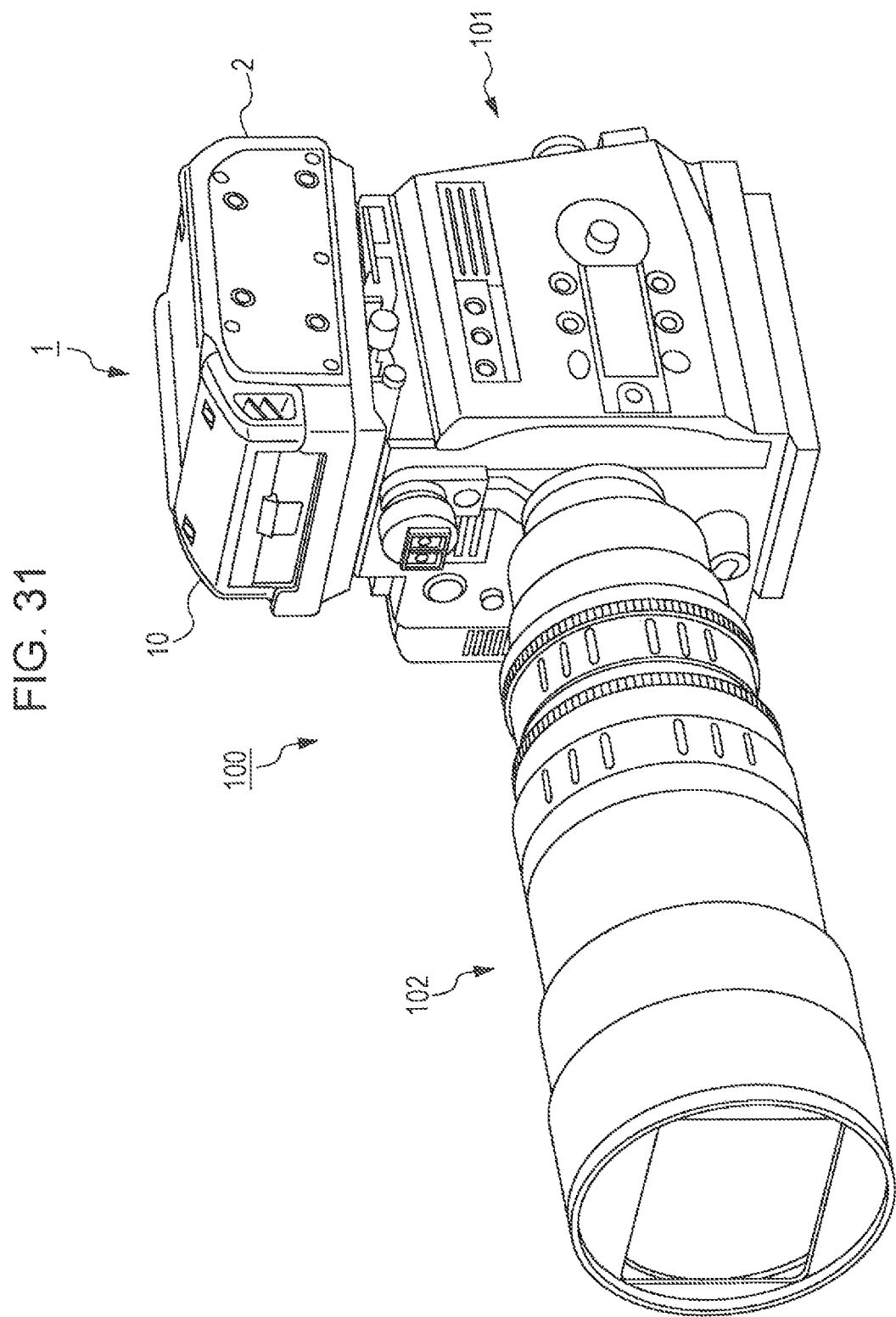
FIG. 31 is a perspective view illustrating a second usage embodiment of an electronic apparatus to which the semiconductor recording medium recording and/or reproducing apparatus shown in FIG. 1 is applied.

FIG. 30 and FIG. 31 show an example of the embodiment in which the memory card recording and reproducing apparatus 1 having the configuration and effect described above is used, in a business camera 100 representing a specific example of an electronic apparatus. FIG. 30 shows a state where the memory card recording and reproducing apparatus 1 is provided on the back face of the video camera 100, and FIG. 31 shows a state where the memory card recording and reproducing apparatus 1 is provided on the upper face of the video camera 100.

The video camera 100 includes a camera body 101 in which an image capturing control device and the other devices are provided, and a lens device 102 that is attachably and detachably mounted on the front face of the camera body 101. In the video camera 100 shown in FIG. 30, the memory card recording and reproducing apparatus 1 is mounted on the back face of the camera body 101 using installation screws (not shown). In the video camera 100 shown in FIG. 31, the memory card recording and reproducing apparatus 1 is mounted on the upper face of the camera body 101 using installation screws (not shown). According to the video camera 100 provided with the memory card recording and reproducing apparatus 1, it is possible to use a mass storage memory card as a storage device, and it is possible to perform continuous capturing for a long time. The intake vent 41 with the angle is provided on the side wall, the intake vent 41 is provided with the drip-proof pieces 42a and 42b, and thus it is possible to prevent substantially vertically dropping raindrops from infiltrating into the openable and closeable cover 10. In addition, since the water channel 17 is provided in the openable and closeable cover 10, it is possible to discharge waterdrops through the water channel 17, and thus it is possible to exhibit the drip-proof effect without using a seal member.

The embodiment has be described above, the present disclosure is not limited to the embodiment, and may be variously modified within the scope which does not deviate from the concept of the present disclosure. In the embodiment described above, the example in which the memory card is interposed between the upper and lower heat sinks to radiate the heat has been described, but only the upper heat sink may be used, and only the lower heat sink may be used. In the upper and lower heat sink, the radiation fins are the linearly extending protruding portions, but may be formed of protruding portions in a curve line shape or in a continuous zigzag shape.

The present disclosure contains subject matter related to that disclosed in Japanese Priority Patent Application JP 2011-06436.9 filed in the Japan Patent Office on Mar. 23, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A semiconductor recording medium recording or reproducing apparatus comprising:
a medium holder that has a medium housing unit in which a semiconductor recording medium is detachably housed;
an exterior case that has a medium entrance through which the semiconductor recording medium is inserted and ejected, and in which the medium holder is housed in a state where the medium housing unit is opposed to the medium entrance;
an openable and closeable cover that opens and closes the medium entrance;
a heat sink that is contactable with the semiconductor recording medium housed in the medium housing unit; and
a heat sink moving unit that moves the heat sink in cooperation with an opening and closing operation of the openable and closeable cover,
wherein the heat sink is moved in a direction separating from the medium housing unit at the time of opening the openable and closeable cover and the heat sink is moved in a direction approaching the medium housing unit at the time of closing the openable and closeable cover by an operation of the heat sink moving unit, to come in press contact with the semiconductor recording medium housed in the medium housing unit.

2. The semiconductor recording medium recording or reproducing apparatus according to claim 1, wherein the heat sink includes a first heat sink and a second heat sink opposed with the medium housing unit interposed there between, and
wherein the heat sink moving unit rotates the first heat sink and the second heat sink with respect to the opposite side as: a rotation center to the medium entrance in cooperation with the opening and closing operation of the openable and closeable cover to more greatly move free end sides of the first heat sink and the second heat sink than the rotation center side.

3. The semiconductor recording medium recording or reproducing apparatus according to claim 2, wherein the heat sink moving unit has a cam plate rotated in cooperation with the opening and closing operation of the openable and closeable cover, and wherein the cam plate is provided with a first cam groove slidably engaging with a first cam pin provided on the first heat sink, and a second cam groove slidably engaging with a second cam pin provided on the second heat sink.

4. The semiconductor recording medium recording or reproducing apparatus according to claim 1, wherein the openable and closeable cover has a front face portion opposed to the medium entrance and a side face portion continuing to the front face portion and opposed to a side face of the medium entrance, wherein the side face portion is provided with an intake vent for taking an external air, and wherein the intake vent is provided with a side wall or a drip-proof piece in which an outside inclination angle is set such that an outside installation position is set low and an inside installation position is set high corresponding to two postures of a horizontal posture and a vertical posture of the exterior case to prevent inundation of raindrops.

5. The semiconductor recording medium recording or reproducing apparatus according to claim 4, wherein an external inclination angle of the side wall of the drip-proof piece or the intake vent is set in the range of 10° to 50°.

6. The semiconductor recording medium recording or reproducing apparatus according to claim 4, wherein a ventilation hole is provided around the medium entrance provided at the front face portion of the exterior case, and wherein a water channel through which water passes to open a gap between the front face portion and the drip-proof piece and to partially overlap with each other.

7. The semiconductor recording medium recording or reproducing apparatus according to claim 4, wherein a cooling fan intaking the air supplied from the intake vent is provided on the opposite side to the ventilation hole of the exterior case.

* * * * *